United States Patent
Zur et al.

(10) Patent No.: US 9,734,468 B2
(45) Date of Patent: Aug. 15, 2017

(54) SYSTEM AND METHOD FOR RESOLVING CUSTOMER COMMUNICATIONS

(75) Inventors: Tal Zur, Petah-Tikva (IL); Roni Krivoshey, Ramat Hasharon (IL); Eyal Dyment Herzfeld, Kfar-Saba (IL); Yohay Etsion, Tel Aviv (IL)

(73) Assignee: NICE LTD., Ra'anana (IL)

(*) Notice: Subject to any disclaimer, the term of this patent is extended or adjusted under 35 U.S.C. 154(b) by 654 days.

(21) Appl. No.: 13/400,850

(22) Filed: Feb. 21, 2012

(65) Prior Publication Data
US 2013/0218947 A1    Aug. 22, 2013

(51) Int. Cl.
G06F 15/16    (2006.01)
G06Q 10/06    (2012.01)

(52) U.S. Cl.
CPC .................................. G06Q 10/06 (2013.01)

(58) Field of Classification Search
CPC ............ G06Q 30/02; G06Q 10/06315; G06C 30/0202; G06F 17/277; H04N 21/2668; H04N 21/4532; H04N 21/4622; H04N 21/25891; H04N 21/44222; H04N 21/458; H04N 21/2385; H04N 21/482
USPC ........ 715/745, 741, 706; 709/203, 202, 228, 709/223, 219, 217, 206, 220, 221, 225, 709/227, 236, 242, 245, 224, 705; 379/265.02, 265.09, 212.01, 265.03, 379/265.11
See application file for complete search history.

(56) References Cited

U.S. PATENT DOCUMENTS

| | | |
|---|---|---|
| 5,535,256 A | 7/1996 | Maloney et al. |
| 6,346,952 B1 | 2/2002 | Shtivelman |
| 6,721,416 B1 | 4/2004 | Farrell |
| 6,741,697 B2 | 5/2004 | Benson et al. |
| 6,748,072 B1 | 6/2004 | McGraw et al. |
| 6,829,348 B1 * | 12/2004 | Schroeder .............. G06Q 30/02 379/265.02 |
| 6,904,143 B1 | 6/2005 | Peterson et al. |
| 6,922,466 B1 | 7/2005 | Peterson et al. |
| 6,922,689 B2 | 7/2005 | Shtivelman |
| 6,959,078 B1 | 10/2005 | Eilbacher et al. |
| 6,970,554 B1 | 11/2005 | Peterson et al. |
| 6,981,040 B1 | 12/2005 | Konig et al. |

(Continued)

OTHER PUBLICATIONS

Office Action from U.S. Appl. No. 13/409,514 dated Feb. 11, 2013.
(Continued)

*Primary Examiner* — Djenane Bayard
(74) *Attorney, Agent, or Firm* — Pearl Cohen Zedek Latzer Baratz LLP

(57) ABSTRACT

A device, system and method for resolving a customer interaction. At a centralized resolver, customer data may be received that is passively transferred from a plurality of devices, wherein each device processes a different type of customer interaction and provides a different associated type of customer data. At the centralized resolver, a customer associated may be identified or associated with each interaction based on the received customer data and the associated data type. The centralized resolver may assign the interaction a universal identification associated with the identified customer, wherein the same universal identification is assigned to interactions of multiple different types that are associated with the same customer.

19 Claims, 13 Drawing Sheets

(56) References Cited

U.S. PATENT DOCUMENTS

| | | |
|---|---|---|
| 7,035,926 B1 | 4/2006 | Cohen et al. |
| 7,165,105 B2 | 1/2007 | Reiner et al. |
| 7,200,614 B2 | 4/2007 | Reid et al. |
| 7,246,078 B2 | 7/2007 | Vincent |
| 7,370,004 B1 | 5/2008 | Patel et al. |
| 7,616,756 B2 | 11/2009 | Blackwood et al. |
| 7,644,134 B2 | 1/2010 | Cohen et al. |
| 7,844,504 B1 | 11/2010 | Flockhart et al. |
| 7,853,800 B2 | 12/2010 | Watson et al. |
| 7,949,574 B2 | 5/2011 | Patel et al. |
| 7,958,234 B2 | 6/2011 | Thomas et al. |
| 7,959,234 B2 | 6/2011 | Cameron et al. |
| 7,962,551 B2 | 6/2011 | Mukundan et al. |
| 7,962,616 B2 | 6/2011 | Kupferman et al. |
| 8,255,971 B1* | 8/2012 | Webb ................ G06Q 20/4016 705/17 |
| 8,271,332 B2 | 9/2012 | Mesaros |
| 8,326,694 B2 | 12/2012 | Patel et al. |
| 8,352,396 B2 | 1/2013 | Forman et al. |
| 8,396,834 B2 | 3/2013 | Bahadori et al. |
| 8,408,061 B2 | 4/2013 | Thomas |
| 2002/0008167 A1 | 1/2002 | Haberland et al. |
| 2002/0035562 A1* | 3/2002 | Roller ................ G06F 17/30592 |
| 2002/0083167 A1 | 6/2002 | Costigan et al. |
| 2002/0087385 A1 | 7/2002 | Vincent |
| 2007/0208682 A1 | 9/2007 | Mancisidor et al. |
| 2010/0153175 A1 | 6/2010 | Pearson et al. |
| 2011/0072052 A1* | 3/2011 | Skarin ................ G06Q 10/10 707/794 |
| 2011/0184905 A1 | 7/2011 | Phillips et al. |
| 2011/0252150 A1* | 10/2011 | Chandrabasu et al. ....... 709/228 |
| 2012/0195422 A1 | 8/2012 | Famous |
| 2012/0209605 A1 | 8/2012 | Hurvitz et al. |
| 2012/0303598 A1 | 11/2012 | Newnham et al. |
| 2012/0303621 A1 | 11/2012 | Newnham et al. |
| 2012/0303659 A1* | 11/2012 | Erhart ................ H04L 29/12594 707/769 |
| 2013/0006874 A1* | 1/2013 | Klemm ........................ 705/304 |
| 2013/0024405 A1 | 1/2013 | Newnham et al. |
| 2013/0080358 A1 | 3/2013 | Newnham et al. |
| 2013/0080377 A1 | 3/2013 | Newnham et al. |
| 2013/0110750 A1 | 5/2013 | Newnham et al. |
| 2013/0136253 A1 | 5/2013 | Liberman et al. |
| 2013/0179550 A1 | 7/2013 | Kakizaki |
| 2013/0185191 A1* | 7/2013 | Ganor ............................ 705/39 |
| 2013/0218947 A1 | 8/2013 | Zur et al. |
| 2013/0232159 A1 | 9/2013 | Daya et al. |

OTHER PUBLICATIONS

Final Office Action from U.S. Appl. No. 13/409,514 dated Jun. 20, 2013.
Office Action from U.S. Appl. No. 13/409,514 dated Sep. 30, 2013.
Final Office Action from U.S. Appl. No. 13/409,514 dated Apr. 25, 2014.
Office Action from U.S. Appl. No. 13/409,514 dated Jun. 5, 2014.
Notice of Allowance from U.S. Appl. No. 13/409,514 dated Dec. 17, 2014.
Office Action from U.S. Appl. No. 13/305,279 dated Jan. 17, 2013.
Final Office Action from U.S. Appl. No. 13/305,279 dated May 23, 2013.
Office Action from U.S. Appl. No. 13/305,279 dated Jun. 6, 2013.
Notice of Allowance from U.S. Appl. No. 13/305,279 dated Nov. 7, 2014.

* cited by examiner

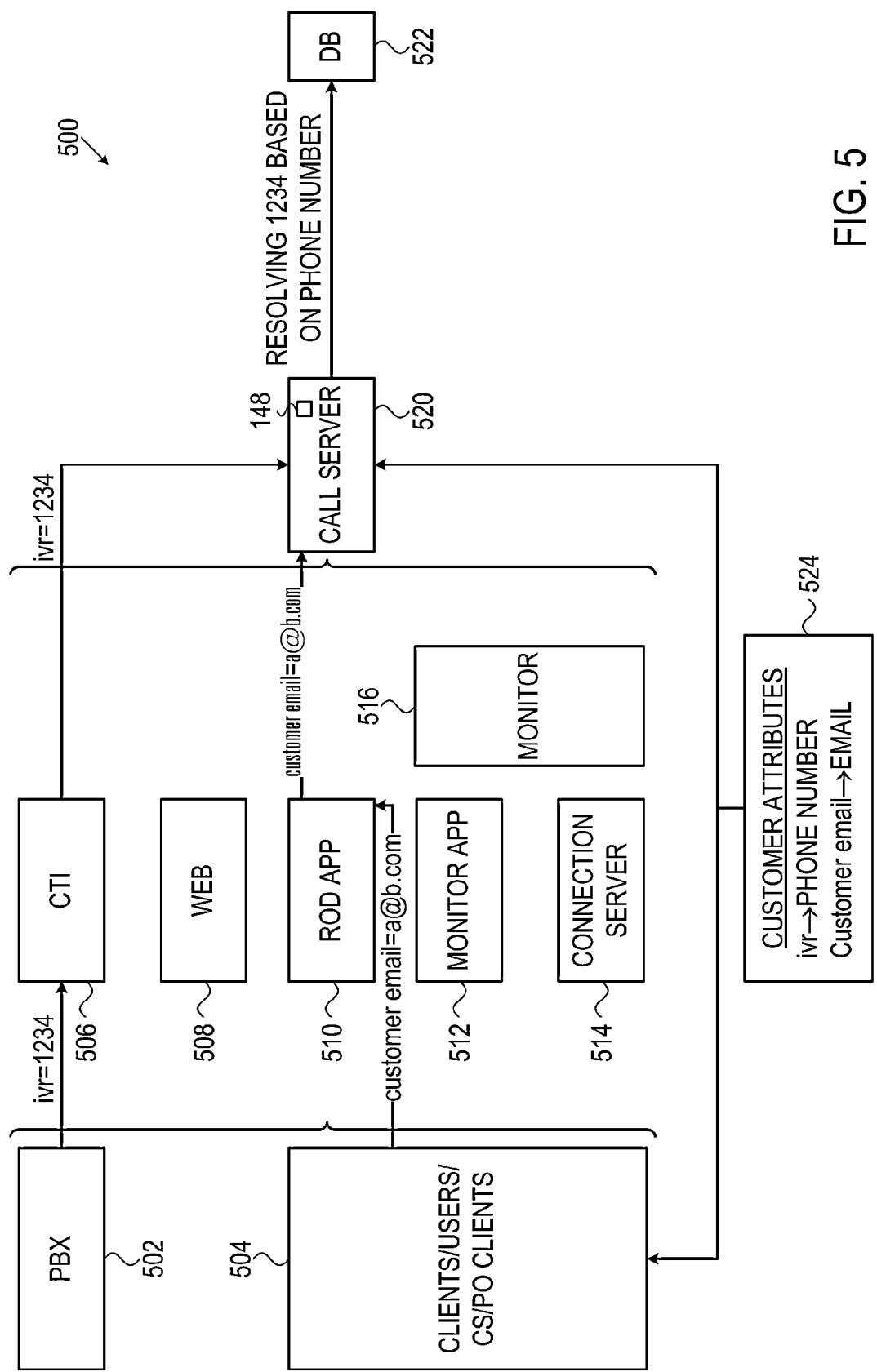

SYSTEM AND METHOD FOR RESOLVING CUSTOMER COMMUNICATIONS

FIELD OF THE INVENTION

Embodiments of the invention relate to systems and methods for monitoring customer-agent interactions at support centers. In particular, embodiments of the invention relate to identifying or "resolving" a customer or account identity associated with each support center interaction.

BACKGROUND OF THE INVENTION

Company call centers or online support forums put customers in contact with company agents for customer service, for example, to provide technical support, sell products or schedule appointments. Company call centers may "resolve" the customer-agent interactions by identifying a customer entity (e.g., "customer"), such as, an individual, company, user group, account, etc., associated with each interaction. Interactions resolved to each customer may be associated with a unique system identification (ID), for example, to access all of the customer's interactions with the single unique ID.

However, in systems that support different types of interactions, the unique customer ID may be resolved using different associated types of customer data. For example, a log-in ID may be used to resolve an interaction over the Internet, a telephone number may be used to resolve an interaction over the telephone and an e-mail address may be used to resolve an interaction over e-mail messaging.

To support such a diverse environment, multiple devices may each resolve a different type of interaction. For example, a text capture device may resolve text interactions, a web analyzer may resolve online or Internet interactions such as web browsing, and a voice capture device may resolve telephone or voice interactions. However, for each support center device to resolve interactions, each device may be responsible for managing customer profile data and logic to run resolving processes. Dividing the task of customer resolving among the many support center devices may replicate customer profile data and resolving tasks, causing repetitive processes and wasted resources. Furthermore, exposing customer profile data to each of the support center devices may sacrifice data security.

SUMMARY OF THE INVENTION

In an embodiment of the invention, a customer interaction may be resolved. At a centralized resolver, customer data may be received that is passively transferred from a plurality of devices, wherein each device processes a different type of customer interaction and provides a different associated type of customer data. At the centralized resolver, a customer associated may be identified or associated with each interaction based on the received customer data and the associated data type. The centralized resolver may assign the interaction a universal identification associated with the identified customer, wherein the same universal identification is assigned to interactions of multiple different types that are associated with the same customer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 schematically illustrates a system for centralized resolving of customer interactions in a multi-platform environment in accordance with an embodiment of the invention;

Figure 1A:
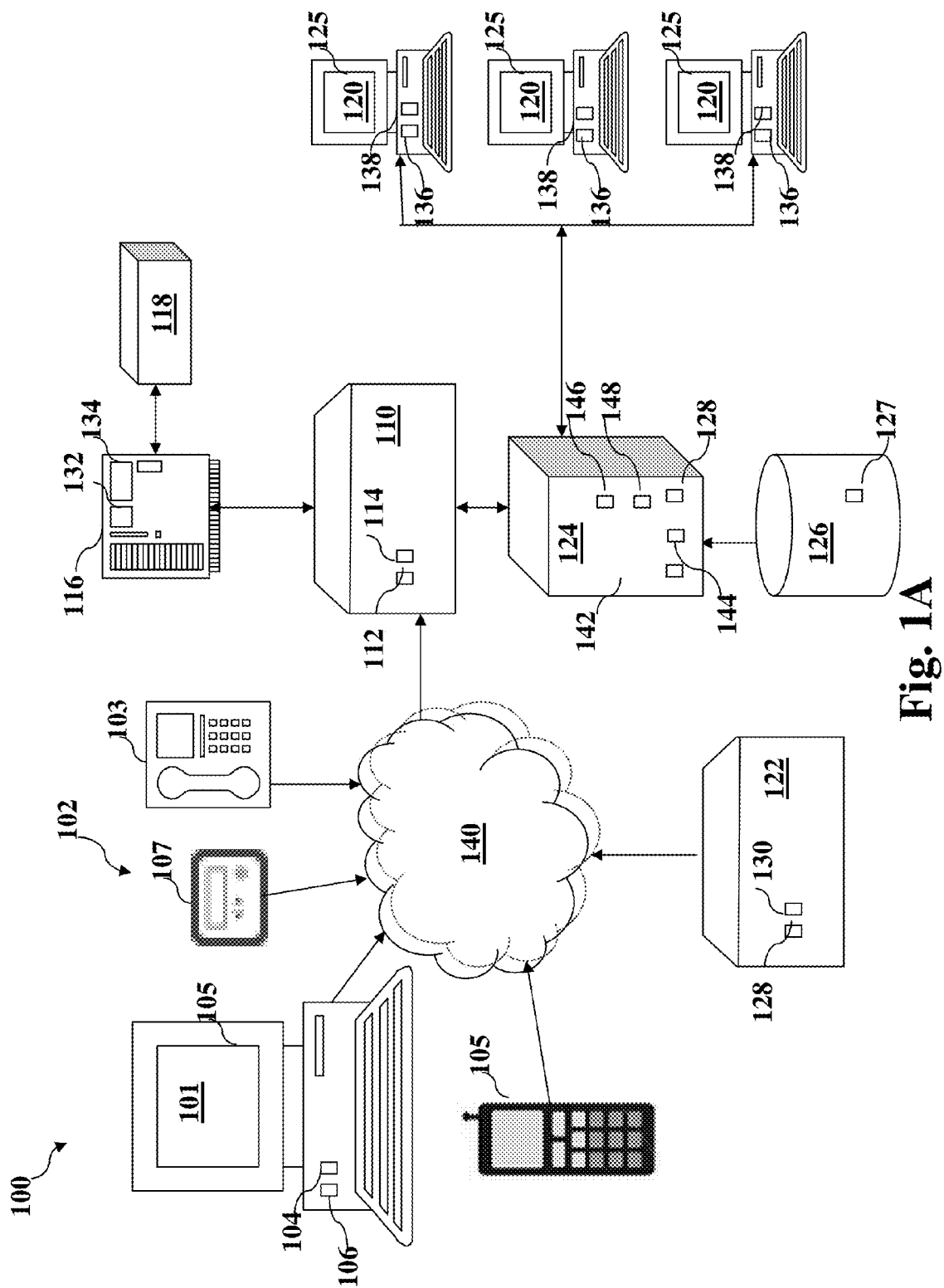
FIG. 1A schematically illustrates a multi-platform system for resolving customer interactions in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, a telephone call may include devices and networks beyond the "plain old telephone system" (POTS), such as voice over Internet protocol (VOIP) telephone calls using personal computers. "Calling" in the context of a person taking action may including using a traditional telephone or other device such as a VOIP telephone, cellular telephone, or other device, to speak with another person. Furthermore, embodiments of the invention may allow for a user to contact an agent via other methods, such as on-line chat. "Calling" in the context of a process or processor taking action may mean, for example, executing a software process, requesting a software process perform some function or return some result, etc.

When used herein, the "web" may refer to the World Wide Web, which may include the Internet and/or an Intranet. The web may be used interchangeably with the Internet and/or Intranet, as the web is a system of interlinked hypertext documents and programs (e.g., VOIP telephone programs, streaming media programs) accessed via the Internet and/or Intranet.

When used herein, "resolving" an interaction may refer to identifying a customer entity (e.g., "customer") associated with the interaction, such as, a customer communicating in the interaction, a device connected during the interaction, or an account logged-in during the interaction. Interaction information resolved to or identified as being associated with each customer entity may be used together to cumulatively track the customer entity and provide an integrated customer interaction history, for example, to aid support center agents in resolving the customer's issues. Typically each interaction is associated with a single customer, but alternatively, may be associated with multiple customers, e.g., for group/conference calls or open forums with multiple participants. In other embodiments, a single user may be associated with multiple customer accounts, e.g., a home account (connected to the user's devices registered to a "home" profile) and a work account (connected to the user's devices registered to a "work" profile), which may include sub-accounts, e.g., per department or team. In general, there may be any one-to-one, one-to-many or many-to-one mapping between users and customer entities.

Embodiments of the invention may resolve interactions (e.g., identify customers associated with the interactions) in a multi-platform environment. Multi-platform environments may support different types of interactions that may differ, for example, by the type of channel over which the interaction is communicated (in a "cross-channel" environment), a tenant ID (in a multi-tenant environment) and/or the customer entity type (in a multi-entity environment). In cross-channel environments, customer interactions may occur across multiple channels of communication and using multiple types of media or formats of information. Communication channels may include, for example, Internet, Intranet, public network, private network, local area network, wide area network, messaging via text messaging, short message service (SMS) messaging, e-mail messaging, blogs or micro-blogs, radio, and telephone or calling channels. Within Internet interactions, multiple channels may be used. For example, a telephone call may be conducted via the Internet on one channel, a web-browsing session may take place on a second channel, and a text interaction may take place on a third channel. Interactions may be recorded between a user or customer and a support center agent over the multiple communication channels, such as the customer accessing an online support website, calling a call center, text messaging (communicating via text messaging) a support center, etc. In cross-channel environments and/or multi-media environments, the recorded interactions may have many different media types, such as, voice recordings, SMS messages, web screenshots, etc. In some embodiments, media type may be an inherent property of a channel and need not be distinguished. For example, a text messaging channel supports text messaging, a telephone channel supports voice interactions, etc. However, in other embodiments, media type and channel type may be independently defined as separate attributes or parameters for resolving interactions. This differentiation may be useful, for example, when a single channel may support interactions of multiple different types, such as, an Internet interaction that includes text and voice or e-mail and chat. The recorded interactions may be stored as raw data or may be processed, for example, by extracting information from the interactions according to predefined rules. Other communication channels and/or media formats may also be used.

Embodiments of the invention provide a centralized resolver, for example, at a call server, which may be the sole device in the system that has the information and logic to fully resolve customer interactions in the multi-platform environment by for example identifying customers associated with the interactions. All other relevant system components peripheral to the centralized resolver may passively transfer customer interactions data to the centralized resolver without resolving or recognizing the data themselves. For example, the peripheral system devices may funnel or stream customer interactions data in an information or "virtual" channel to the central resolver without processing, analyzing or even recognizing the meaning or type of the data themselves. In one embodiment, the data type may be defined by "customer attributes," which only have meaning to the centralized resolver and not to the peripheral devices.

By centralizing system resolving, embodiments of the invention need only store a single copy of the customer interactions data and execute or run a single resolver task per interaction. Furthermore, such embodiments may increase system security by storing all the customer interactions data at a secure centralized location. Devices which may handle or process customer interactions and provide customer data may include a text capture module, a web analyzer, a voice module, etc. Each such device may provide customer data associated with the type of interaction carried out by that device. For example, associated data may be of the type e-mail, fax, telephone, log-in username, etc.

To resolve an interaction (e.g., to determine the customer involved in the interaction), customer data may be extracted from each interaction. In a multi-platform environment, the extracted data may have a specific data type. For example, only a customer's web data may be extracted from a web (Internet) interaction; only a customer's e-mail address may be extracted from an e-mail message interaction. Accordingly, each interaction may provide extracted customer data (e.g., a.s@abc.com) for only a partial or sub-set of the customer's complete data profile that is associated with a particular data type (e.g., e-mail).

To resolve the customer data in the multi-platform environment, the resolver may associate the extracted customer data with a data type, for example, using customer attributes. Customer attributes may define, for example, parameters or data items such as a type of channel, a type of information medium or format, a tenant, a customer entity type, etc., associated with the specific interaction. The channel type attribute may distinguish customer interactions that occur over different channels of communication, such as, for example, Internet, radio, and telephone or calling channels. The tenant attribute may distinguish interaction types associated with different intermediaries, such as, companies or service suppliers that supply system capabilities to customers. The entity type attribute may distinguish interaction types associated with different types of customer entities, such as, individual, company, user group, account, etc. Other customer attributes may also be used. Attributes may be configurable parameters set to define all variables in the customer data type to fully resolve interactions in any multi-platform environment. A customer's data values for each attribute may be extracted from a customer entering his or her data manually (e.g., into customer profile fields) or by an automated device capturing the data (e.g., from an agent screenshot).

The centralized resolver may be connected to a plurality of attribute-specific databases, each storing customer data for a specific attribute or data type. For example, an e-mail database, a telephone database, and a web database may each store their respective data types, e-mail, telephone, and web customer data, for their respective channel attribute. The attribute-specific customer data in each database may be linked to a customer ID. To resolve an interaction based on the associated extracted customer data (e.g., to return a customer identification based on the data), the centralized resolver may first identify the type or attributes associated with that extracted customer data and then access the corresponding attribute-specific database for the identified attributes. Once a match is found between the input extracted customer data and the stored database customer data, the resolver may assign the customer ID linked thereto to the interaction associated with the input extracted customer data.

The customer data may be resolved to customers using a coherent set of rules that generate the same single universal identifier for each unique customer entity (e.g., person, account, company, profile, etc.), regardless of the communication channel, media type and/or other interaction variables. Each attribute-specific database may link its attribute-specific customer data with the same universal customer ID for the same customer entity. The single universal identifier may be a unique identification code or value (e.g., customer ID) assigned to or associated with interactions that are executed by the same customer which took place or were executed over multiple different communication channels, using multiple different interactions devices (e.g., telephone, computer, etc.), using multiple different tenant services, etc. Thus, in contrast to conventional systems that assign each of the customer's interactions an attribute-specific code, all the customer's interactions associated with all combinations of attributes may be linked to the same customer identification code.

Once all the customer's interaction records are universally identified, all these records may be simultaneously accessed and retrieved from memory using the single or unique identifier. The interactions may be stored in an interaction database, for example, together or separately for each type of communication or attribute. If the memory stores data separately for each communication channel (e.g., using separate e-mail messaging, web, and telephone databases), the single identifier may be associated with an address or location for the customer's interactions in each of the relevant databases. The address or location of the customer's interaction record(s) in the relevant databases or data repositories may be stored in the resolving database, a cache, a look-up table or another storage reference structure, according to or linked to the customer's single identifier.

Reference is made to FIG. 1A, which schematically illustrates a multi-platform system 100 for resolving a customer's interactions in accordance with an embodiment of the invention.

System 100 may include one or more user devices 102, such as, a computer 101, a telephone 103, a cellular or mobile device 105, and/or SMS or text message enabled device 107. Customers may operate user devices 102 to interact over one or more communication channels via one or more networks 140. For example, user computer 101 or mobile device 105, e.g., controlled by a customer or user, may access documents, websites and web pages provided by web servers 122 via one or more networks such as a network 140, such as, the web or Internet. User telephone 103 or mobile device 105 may make a call via one or more networks such as network 140, such as, a public switched telephone network (PSTN). User messaging device 107 may send text or SMS messages via a network 140, such as, a messaging or e-mail message network. Other user devices 102 and networks 140 may be used.

Customers may interact via user devices 102 with live (e.g. human) or automated (e.g. computer generated or operated) agents at agent devices 120 in an interaction center 124. Agents may provide users with customer support, conduct transactions for purchasing products or services, fill out surveys, or provide other products or services. Agent devices 120 may include the same or different device(s) as user devices 102, such as, computers, telephones, cellular devices, and/or messaging devices. In one example implementing different devices, voice interactions may be recorded via user telephone 103 and transcribed as text displayed on agent computer 120.

Interactions center 124 may be responsible for scheduling telephone or web-connections between user devices 102 and agent devices 120, recording interactions between the user and agent, managing rules for recording and storing interactions, and populating an interactions database 126 with the interaction data. Interactions center 124 may be installed on a dedicated server.

System 100 may include one or more capture servers 110 and/or storage centers 118 for recording and storing users' interaction data over one or more of the multiple communication channels available via network(s) 140. Capture servers 110 may record, copy, or capture user traffic over network 140, for example, using a passive sniffing device or probe. Capture servers 110 may store the captured traffic data in storage centers 118, for example, as long-term and/or short-term memory.

An analysis server 116 may extract content data from the captured interaction content and/or its metadata according to predefined rules to edit and index the extracted interaction content, for example, to create an organized and uniform format of user interactions. Analysis server 116 may transfer the formatted interaction data to interactions center 124 for storage in database 126. In one embodiment, analysis server 116 and interactions center 124 may be installed on the same server.

In the multi-platform system 100, different interaction center components 146 (e.g., a text capture, a web analyzer, a voice module, etc.) may host or analyze interactions for each different type of user device 102 (e.g., text message device 107, computer 101, telephone 103, etc.) or media type (e.g., text messaging, web browsing, telephone calling, etc.). Each interaction center component 146 may extract customer data specific to the particular interaction type associated with the component. In various embodiments, a single unique type (or multiple types) of customer data may be extracted using each component 146. For example, a web analyzer component may extract an Internet protocol (IP) address, a voice module component may extract a telephone number, etc. The extracted customer data type may be defined by or correspond to a set of attributes, for example, specifying the type of communication channel, tenant, and/or customer entity of the interaction.

In conventional systems, interactions of each different type are typically resolved at the interaction component associated with that type (e.g., an e-mail server resolves e-mails, a telephone system resolves telephone calls, etc.). Accordingly, resolving logic and tasks may be duplicated at each multiple different interaction component, slowing down system processing times. Furthermore, extra steps may be used to conform the resolving results to generate a uniform resolving index and/or process or handle any resolving conflicts between different interaction components.

In contrast, according to embodiments of the invention, all different interaction center component 146 (e.g., text capture, web analyzer, voice module, etc.) may transfer all the extracted customer data of all different types to a centralized resolver 148 without analyzing or even recognizing the data type. Each component 146 may transfer its customer data of the data type associated with that particular component's modality (e.g., e-mail, telephone, text message, etc.). Due to the variety in data types in the multi-platform environment, in addition to the customer data, interaction center component 146 may also transfer the attribute(s) values defining the type of the interaction data. Each interaction center component 146 may include a plug-in, application or code to instantly and passively transfer all customer data and associated attributes to centralized resolver 148. In another embodiment, each interaction center component 146 need not send attribute data but may instead automatically be associated with specific attributes (e.g., text message enabled device 107 may automatically be associated with a text channel attribute). The data transferred from component 146 to centralized resolver 148 may create a virtual information channel designated for funneling data only for resolving interactions.

Centralized resolver 148 may use the customer data and associated attributes to resolve the interactions. Centralized resolver 148 may be connected to a customer data repository 127 divided into a plurality of attribute-specific storage structures (e.g., as described in reference to repository 150 of FIG. 1B). Depending on the attributes associated with the customer data, centralized resolver 148 may access a portion of repository 127 storing only the subset of the customer's data associated with that attribute type. Centralized resolver 148 may search for customer data in the attribute-specific portion of repository 127 that substantially matched the extracted customer data. Each customer data entry in the attribute-specific portion of repository 127 may be associated with a universal customer identifier. Centralized resolver 148 may assign the interaction the universal customer identifier that is associated with the matching customer data from repository 127. The universal customer identifier may be stored together with the interaction to which it is assigned in database 126 or separately, e.g., in memory unit 144.

Figure 8:
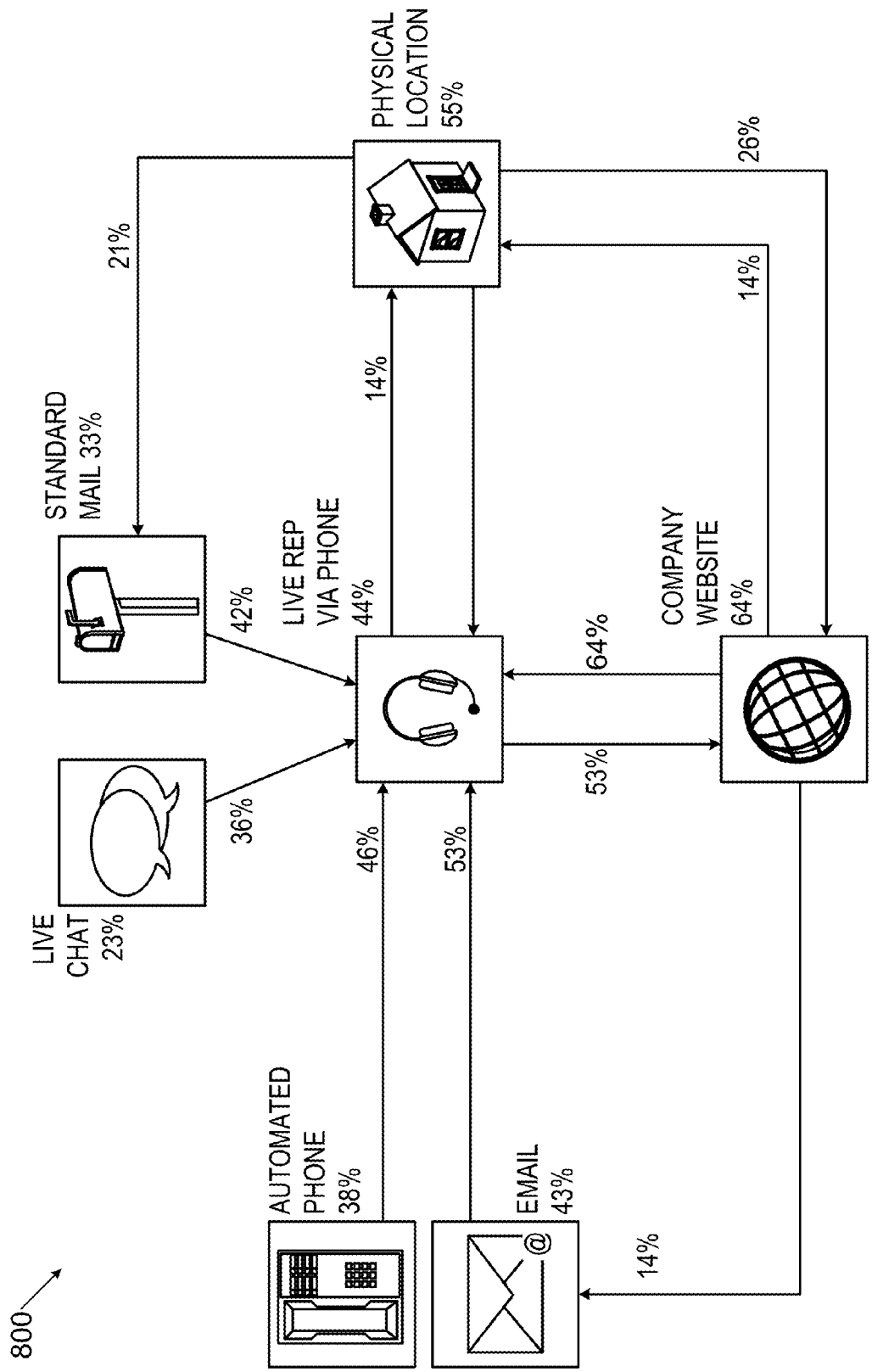
FIG. 8 schematically illustrates statistical data defining the rate of return of customers to an interaction center in accordance with an embodiment of the invention.

Centralized resolver 148 may resolve customers "on-the-fly" or in "real time," for example, as the interactions are ongoing or passed to storage, or "offline" in a post-processing procedure. In some embodiments, centralized resolver 148 may access a local customer cache 128 instead of repository 127 to locally access customer information duplicated from repository 127 for the most recently resolved customers. Since customers who previously access interactions center 124 have the greatest probability of returning, customer cache 128 may accelerate resolving times for these return customers. Example statistics related to customer return rates are shown in FIG. 8.

Once customer interactions are resolved, for each interaction having a specific attribute type, centralized resolver 148 may associate, assign, attach or map the single universal customer identification code to all the customer's interactions of all attribute types (e.g., which may (or may not) include cross-channel interactions). Database 126 may store all interaction data for each customer. The collection of customers may be defined, for example, in a customer relationship management (CRM) library at repository 127, which may be specific to each company or interaction center 124. In one embodiment, database 126 may group, not only the customer data, but also the interactions themselves into separate sub-repositories for different attribute types (e.g., an e-mail interactions database, a web interactions database, a telephone interactions database, etc.) or, alternatively, may group interactions for each different customer, or may use no grouping at all.

In this manner or other manners content or interactions associated with multiple different attributes may be associated with or linked to a common user or customer entity. Interactions center 124 may compile or assemble each user's associated interaction content to generate a history or summary of the user's interaction history including their cross-channel interactions associated with the same single universal identifier.

The customer's associated content, summary and/or history may be sent to agent device 120, for example, for the agent to understand the customer's cumulative interactions over different communication channels, with different tenants and/or using different entity types. Agent devices 120 may automatically or, after sending a request, retrieve the interactions data content, summary and/or history from database 126 associated with the customer identifier. Agent devices 120 may display the customer's retrieve interactions data, for example, on a workstation display 125. Customer interactions may be tracked in real-time, for example, during the customer interactions or at a small time delay thereafter (e.g., on the order or a few seconds or milliseconds). Alternatively, customer interactions may be tracked offline such as in a customer report sent to the agent after the session is completed. In a real-time embodiment, agent device 120 may automatically gain access to the user's interaction history linked to the single customer identifier and/or a simulation of their interactions. In one example, agent device 120 may "shadow browse" a user computer, for example, providing agent devices 120 with real-time playback of user device 102 interactions so that the agent may monitor or guide user interactions in real-time. Database 126 may also store recommendations for prompting the agent to interact with the customer in a predefined manner.

Agents may include real-life interactive personnel, automated computer agents, avatars, voice or text prompts, etc., or a combination semi-live/semi-automated agent. In one embodiment, an automated agent may track a user's multi-platform interactions in real-time and provide responses, for example, from database 126, that may be linked to the customer's universal identifier.

User device 102, capture server 110, analysis server 116, agent device 120 web server 122 and interaction center 124, may each include one or more controller(s) or processor(s) 106, 112, 132, 136, 128, and 142, respectively, for executing operations and one or more memory unit(s) 104, 114, 134, 138, 130 and 144, respectively, for storing data and/or instructions (e.g., software) executable by a processor. Processor(s) 106, 112, 132, 128, 136 and 142 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 104, 114, 134, 138, 130 and 144 and/or repository 127 and cache 128 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. User device 102 and agent device 120 may include one or more input devices, for receiving input from a user or agent (e.g., via a pointing device, click-wheel or mouse, keys, touch screen, recorder/microphone, other input components) and output devices 105 and 125 (e.g., a monitor or screen) for displaying data to a customer and agent, respectively.

Web capture server 110, analysis server 116, storage centers 118, agent device 120, and interactions center 124, may each be, for example, software executed on one or more processors, and while this software may be in one processing device or server, it is not necessarily executed by the same processor or within the same computing device.

Embodiments of the invention may resolve customers and/or accounts with a minimum influence on existing components or flows. Embodiments of the invention may resolve customers and/or accounts based on interactions in any suitable type of media or modality (e.g., voice, text, video, screen, etc.) and over any type of communication channel (e.g., telephone, messaging, Internet, etc.). Media type may be the same as (or different than) channel type. Embodiments of the invention may resolve customers and/or accounts based on several different attributes for a single interaction. An interaction may be defined as a basic element of communication handled by any uninterrupted communication channel. For example, a voice call may be an interaction, an e-mail may be an interaction, an SMS message may be an interaction, but a voice call interrupted by a transfer may be divided into two interactions (e.g., the original call and the call after the transfer). Other definitions of may be used according to system specifications.

In one embodiment of the invention, each customer and/or account may be resolved using an interaction attribute that may or may not be filled with values defining the customer's personal information or information related to or associated with a customer. In one example, each attribute may be defined using one (or more) parameters: (1) an entity type (e.g., customer or account), (2) a channel type (e.g., e-mail messaging, telephone number, etc.) and (3) a tenant (e.g., company X, company Y, etc.). It may be appreciated that the attributes parameters used to resolve an interaction may vary based on the type of multi-platform environment. In one embodiment, each multi-platform environment (e.g., multi-channel, multi-tenant, multi-entity, etc.) may have a corresponding variable associated therewith (e.g., channel type, tenant ID, entity type, etc., respectively) that may be defined to resolve the interaction. In one example, a tenant ID may only be used to resolve interactions in a multi-tenant environment (e.g., and in some cases need not be used when performing a cross-tenant search to retrieve interactions independently of their tenants in a multi-tenant environment). In some embodiments, cross-tenant searching may be restricted in some or all tenant databases based on tenant security policies.

In one example, a customer attribute may be: [customer, e-mail address]. If the attribute has a value (e.g., abcd@abcd.com), the customer associated with the interaction may be resolved based on that attribute value. For example, if the customer attribute and value are ([customer, e-mail], abcd@abcd.com), an interaction may be resolved based on the customer's e-mail address, "abcd@abcd.com". Thus, the input for resolving an interaction may only include a single value for a relevant attribute. Values for one or more customer and/or account attributes may be initially defined when creating the account or customer profile, for example, by the customer or account holder, an agent or administrator creating the account, or an automated account creator module (e.g., in processor 142). Each account or customer profile may include an unlimited number of attributes, from which a best match may be detected for interactions with associated attributes. The criteria for the best match definition may be configured, for example, dynamically by a system administrator (e.g., via a process optimization (PO) designer).

In one example, customer and/or account resolving may be executed at a centralized resolver (e.g., centralized resolver 148 of FIG. 1A). The centralized resolver may be connected or integral to an interaction center (e.g., interaction center 124 of FIG. 1A), a call server (e.g., call server 201 of FIGS. 2A-4B) and/or a media interconnect module (e.g., media interconnect module 212 of FIGS. 2A-4B). All devices other than the centralized resolver may pass their interaction and/or customer data to the centralized resolver, for example, via a designated resolving channel, without analyzing the data.

To account for the diversity in interactions in a multi-platform environment, the centralized resolver may resolve interactions according to their associated attributes. Customer attributes may provide a virtual channel for conveying information to be used for customer resolving. Each peripheral device that processes or handles interactions may only deliver values through the virtual channel associated with the relevant attributes. By using an attribute channel for a specific type of attribute, these devices implicitly associate the value with that customer attribute. These devices may have no knowledge of attributes, the meaning of the attribute values they pass, or how to resolve interactions using those values. On the other side of the virtual channel, the centralized resolver may perform the resolving. The centralized resolver may be the sole system device that recognizes these attributes. For example, the attributes may only be defined at the centralized resolver. In one embodiment, for example to enhance system security, the customer data and/or attributes may be encrypted (e.g., when it is created at user device 102 of FIG. 1A using an encryption key) and only the centralized resolver may decrypt the data (e.g., having the only copy of the corresponding decryption key). In this way, only the centralized resolver may read and recognize the meaning of the customer data used to resolve the corresponding interaction. The centralized resolver may query the customer repository with the customer data according to the attributes. The repository may return a universal customer ID for the query data, which the centralized resolver may assign to the interaction.

Figure 1B:
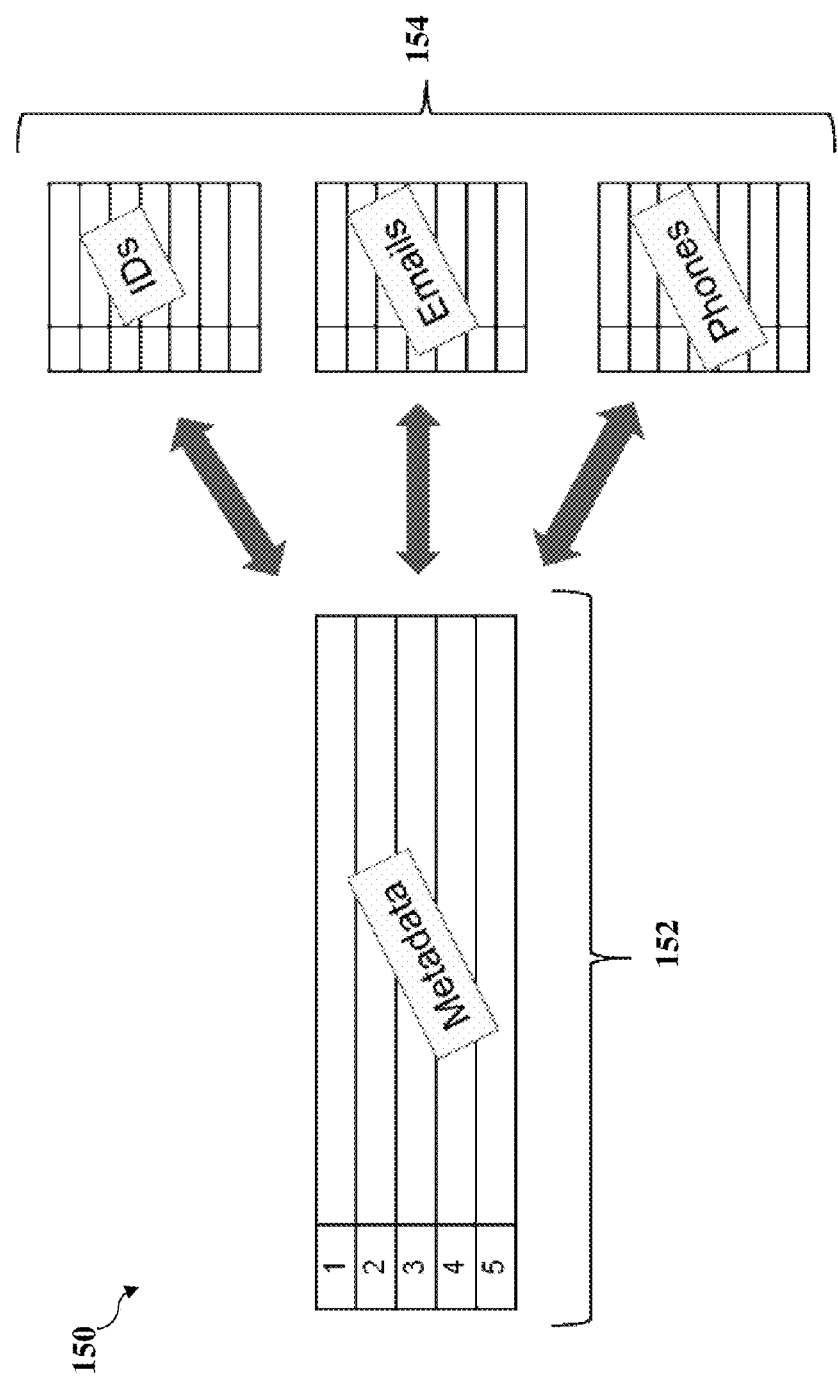
FIG. 1B schematically illustrates a data repository for storing customer attributes in a multi-platform environment in accordance with embodiments of the invention.

Reference is made to FIG. 1B, which schematically illustrate a data repository 150 (e.g., repository 127 of FIG. 1A) for storing customer attributes in a multi-platform environment in accordance with an embodiment of the invention.

Data repository 150 may divide customer/account data, for example, in a metadata table 152 that stores the customer/account metadata and identifier tables 154 that stores the customers/accounts unique (but not universal) identifiers. Metadata table 152 may include customers' non-unique data, for example, customer first name, customer last name, gender, address, birth date, nationality, etc. Identifier tables 154 may include each customer unique identifier, for example, ID (e.g. government or passport ID), web login ID, chat ID, telephone number, e-mail address, Facebook account and Twitter account. Each of these unique identifiers may be stored in a separate table 154 for each different data type or attribute or alternatively, may be stored together (e.g., merging tables 154).

Tables 152 and 154 are "connected" or associated by their universal customer ID (e.g., the same for all attributes or data types). Accordingly, for any customer listed in metadata table 152, all the customer's identifiers may be retrieved from identifier table 154 using his unique customer ID, and vice versa.

To resolve an interaction, a resolver may generate a query that includes an attribute type and value. The resolver may access the one of identifier tables 154 associated with the query attribute type. The resolver may search for the query value in the relevant identifier table 154. If a match is found, the search may return the universal customer ID associated with the matching entry value in identifier table 154. If further actions are requested, such as retrieving personal customer information (e.g. metadata or associated unique identifiers of other types), such data may be retrieved using the returned universal customer ID.

Embodiments of the invention may enable dynamic customer resolving for all suitable types of interactions (e.g., voice, text, video, etc.). Embodiments of the invention may associate a plurality of attributes for interactions, for example, each defining a different media format or communication channel. Embodiments of the invention may centralize logic, hardware and/or software for customer and/or account resolving inside a single component, for example, the centralized resolver (e.g., centralized resolver 148 FIG. 1A), while hiding such logic from other components in the system (e.g., voice interaction module 202, web analyzer 216 and text capture module 204 of FIGS. 2A-4B). Centralizing customer resolving may provide a more flexible, dynamic and secure environment for customer resolving.

Figure 2A:
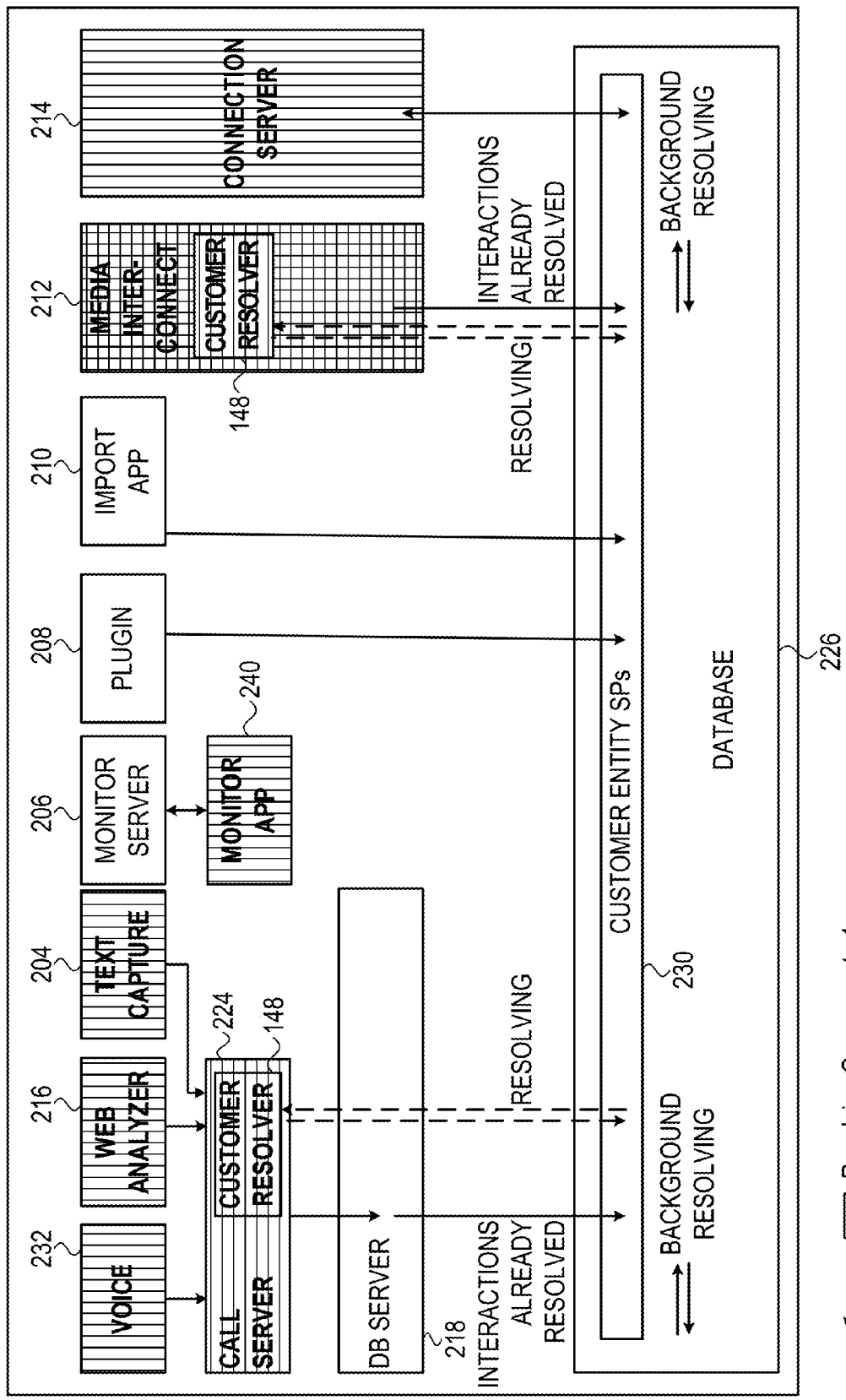
FIGS. 2A-4B schematically illustrate systems for centralized resolving of customer interactions in a multi-platform environment in accordance with embodiments of the invention.
Figure 2B:
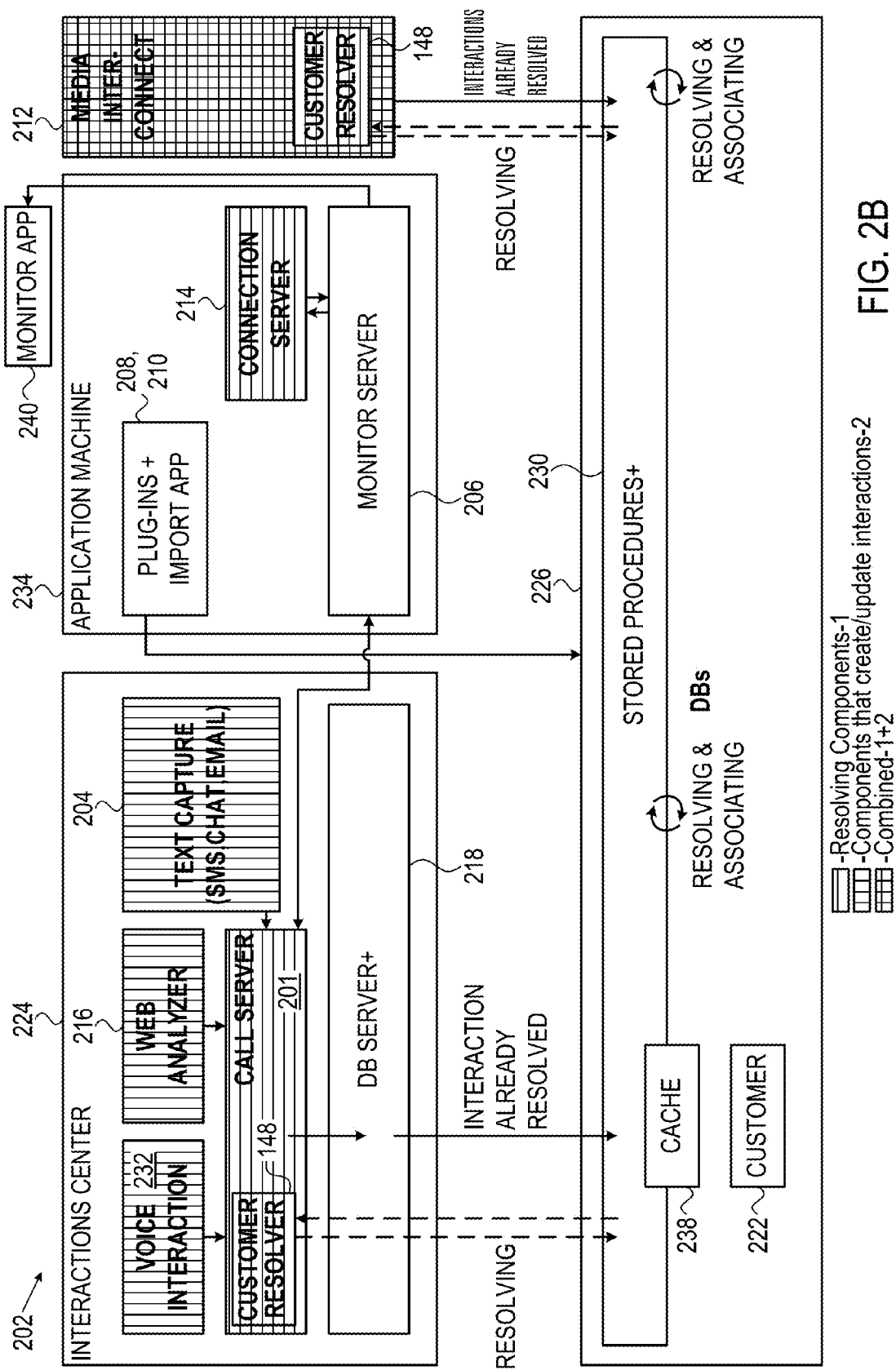
Figure 3A:
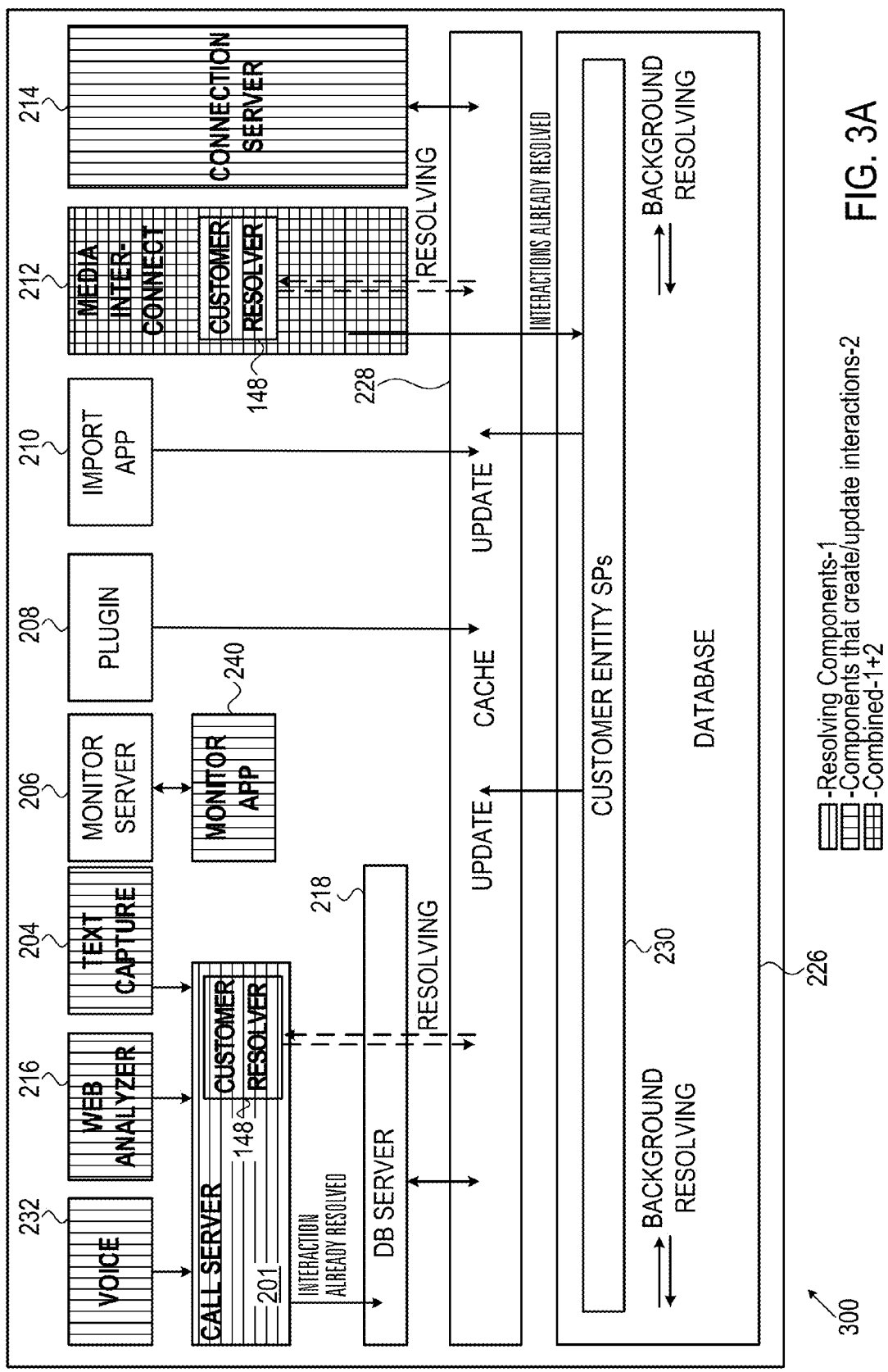
Figure 3B:
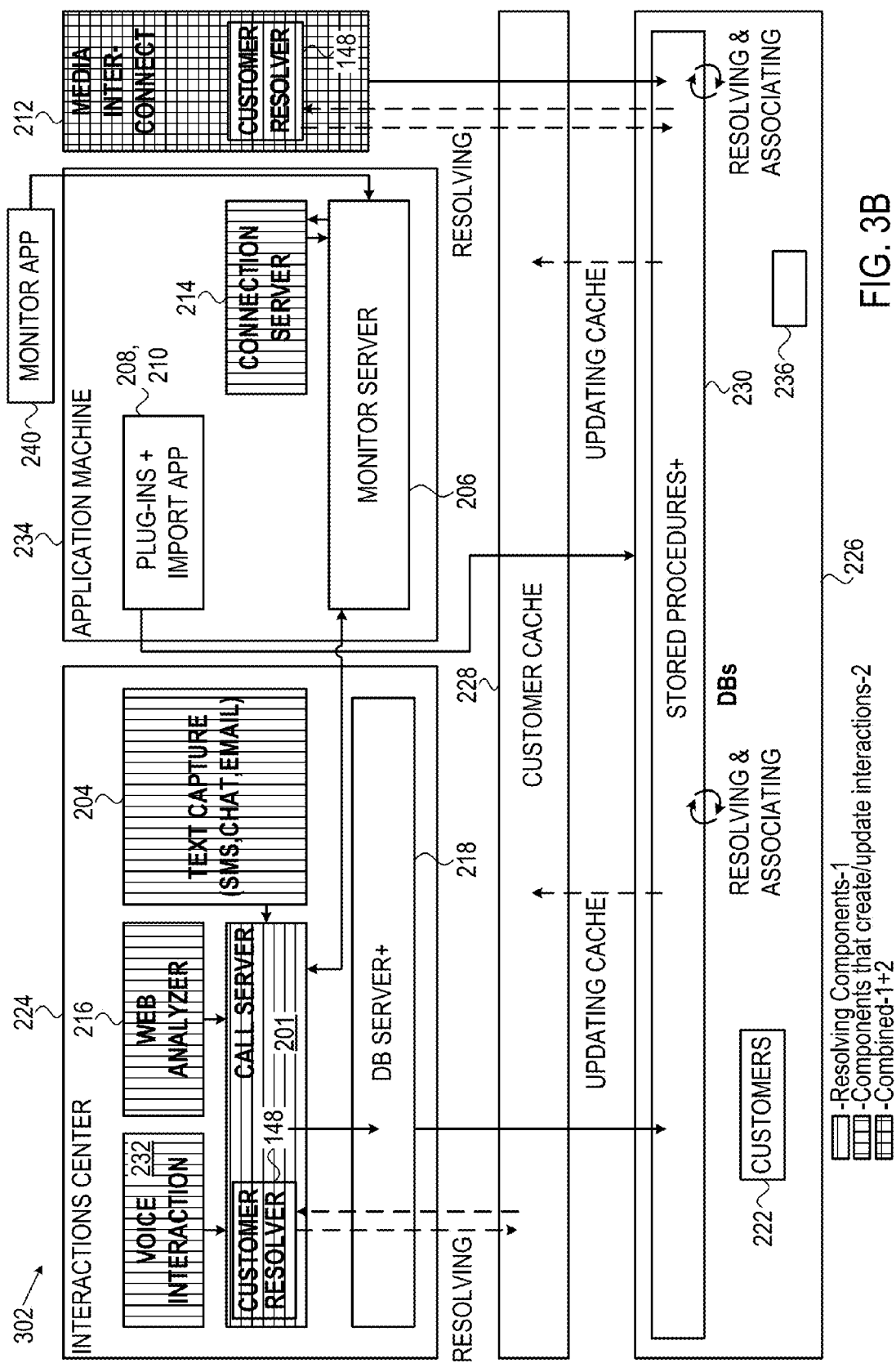
Figure 4A:
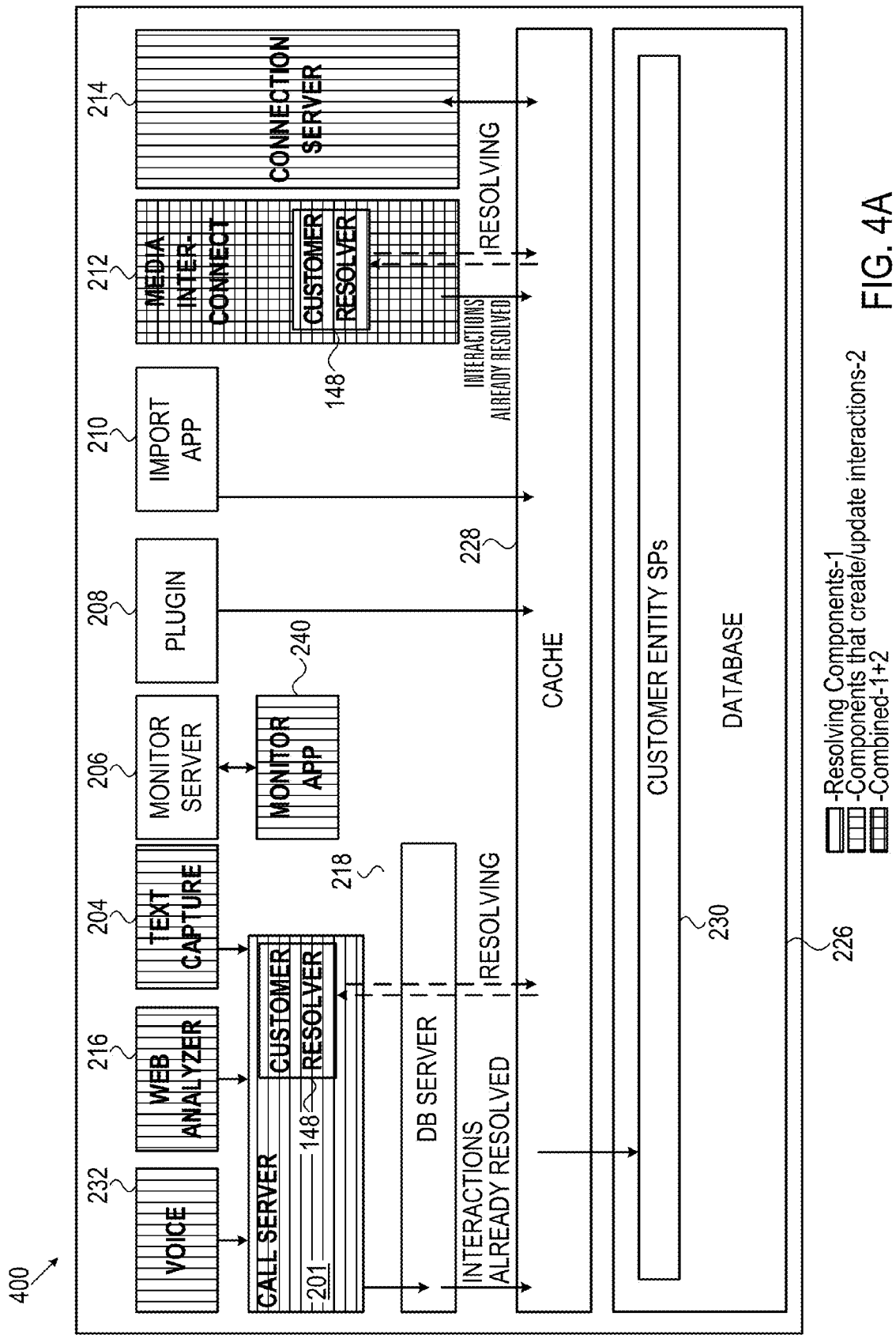
Figure 4B:
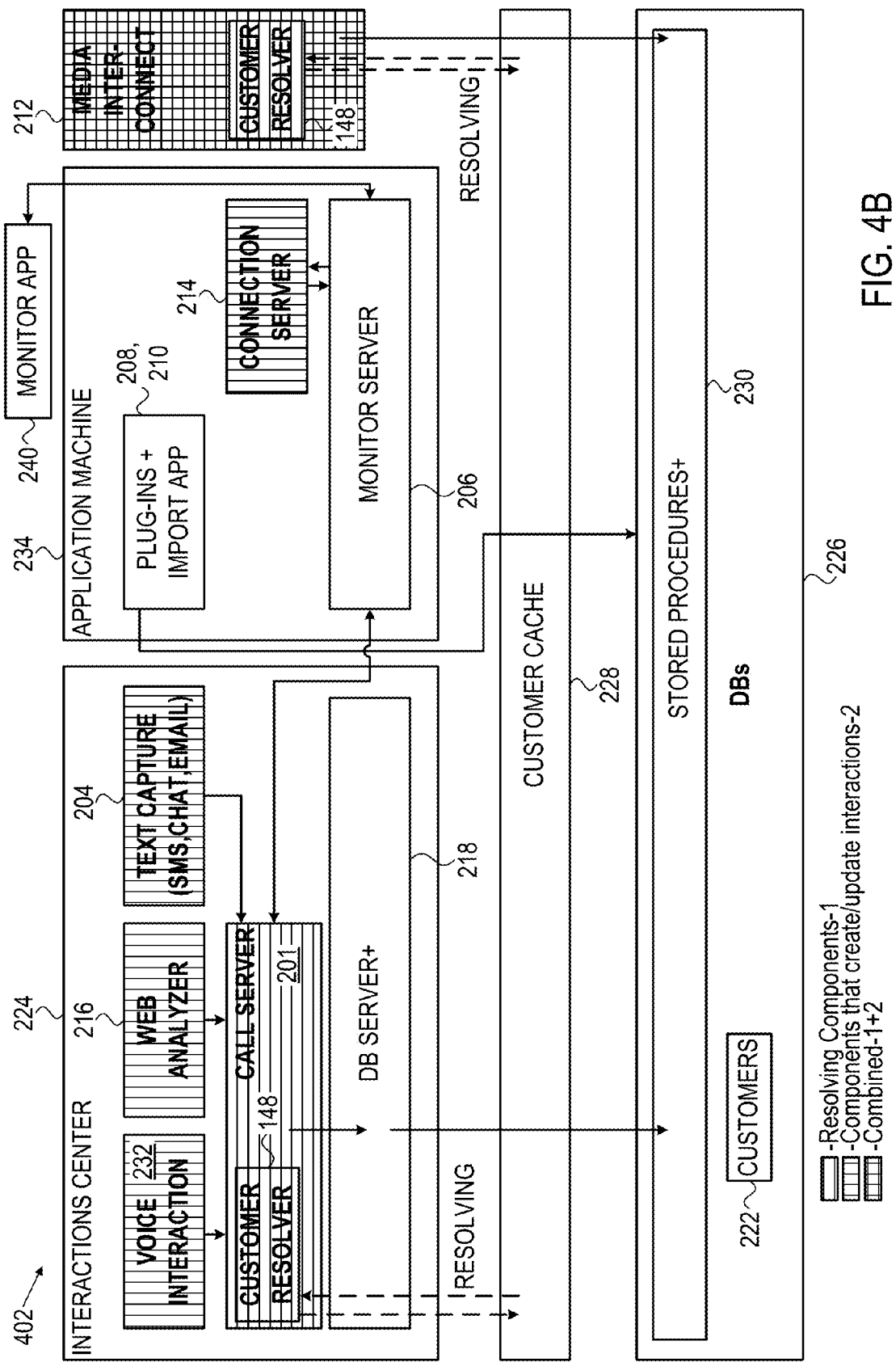

Reference is made to FIGS. 2A-4B, which schematically illustrate systems for centralized resolving of interactions in a multi-platform environment in accordance with embodiments of the invention. FIGS. 2A, 3A, and 4A show layer views of each system's components with respect to their operational layers, while FIGS. 2B, 3B, and 4B show machine views of the system's components with respect to their device configurations. Components and processes of FIGS. 2A-4B may be executed using devices and processors of FIG. 1A, such as, for example, capture server 110, analysis server 116, agent device 120 and interactions center 124, and their respective processors 112, 132, 136 and 142.

Systems 202, 302 and 402 may include an interactions center (IC) 224 (e.g., interactions center 124 of FIG. 1A) to manage and schedule customers' cross-channel interactions. Interactions center 224 may include a plurality of agent devices (e.g., agent device 120 of FIG. 1A). Systems 200-202 may include an application machine 234, for example, installed on each agent device, to connect the agent device to a user device (e.g., user device 102 of FIG. 1A) operated by a customer.

Interactions center 224 may include a computer telephony integration (CTI) machine to coordinate and integrate interactions from computer and telephone user devices. Interactions center 224 may include a voice interaction module 232 to recognize, transcribe and analyze customer and/or agent voice or telephone interactions, a web analyzer 216 to capture, analyze and summarize a customer's computer or web interactions, and a text capture module 204 to recognize and analyze a customer's text interactions, such as, SMS, chat and e-mail messaging. Interactions center 224 may include a centralized resolver 148 to resolve customer interactions (e.g., voice, web and/or text), for example, according to stored procedure 230 accessed via database server 218 from an interactions database 226 (e.g., database 126 of FIG. 1A). Centralized resolver 148 may be installed at a call server 201 and/or media interconnect module 212. Media interconnect module 212 may process voice interactions. Media interconnect module 212 may import voice interactions and reformat the interactions to conform to the system specifications.

Application machine 234 may include a plug-in 208, an import application module 210 to import/export customer information to/from a customer repository 222 and a monitor server 206. Application machine 234 may provide interactions center 224 (and agent devices therein) with real-time connections to customer interaction sessions. Monitor server 206 may be connected to a monitor application 240, which handles open/ongoing communications, and may stop/resume interaction recordings. Plug-in 208 may be used to set different system configuration parameters, such as, customer attributes. Import application module 210 may be used manage a customer repository 222 (e.g., customer repository 127 or 150 of FIGS. 1A-1B) of customer data including customer profiles and information registered to each customer entity. When an agent device connects to a customer's device, import application module 210 may determine if the customer is new or returning and/or if the customer's registration is complete (e.g., all profile fields have been entered). Plug-in 208 and import application module 210 may be integrated or separate and may run "on top of" database 226, e.g., use database 226 typically using a database 226 API. Database 226 may store customer repository 222 including previously registered customer profiles. For each new customer or updated customer profile, import application module 210 may send database 226 updates to customer repository 222 (e.g., periodically or when updated are received) so that stored procedure 230 may recognize each customer entity.

Text capture module 204, web analyzer 216, voice interaction module 232, media interconnect module 212, and connection server 214 may output customer data having many variables including, for example, different communication channels such as telephone, Internet, or messaging, different media types such as voice recordings, screenshots or video, captured in different on-line (e.g., real-time) or off-line (post-processing) environments, associated with different tenants and/or associated with different entity types (e.g., individual, account, company, profile, etc.). To consolidate this varied interaction data, the customer data may be resolved by centralized resolver 148 using stored procedures 230 to generate the same universal identifier for each customer entity, regardless of the channel, media type, tenant, and/or recording environment.

Systems 200, 300, and 400 (in the layer view) and 202, 302, and 402 (in the machine view) may process or handle two fundamental tasks for customer entities (other tasks may also be handled): (1) Manage a repository 222 of customer entities, and (2) resolve customers associated with interactions. In some embodiments, customers may be resolved explicitly, for example, in real-time or in a current or ongoing interaction session, or implicitly, for example, offline or in a background or post-processing procedure. In one example, explicit customer resolving may receive a customer attribute type and value (e.g., "E-mail"+ "a@b.com") and may return the customer ID or the entire customer profile. Explicit or "real-time" customer resolving is typically used for a client (e.g., call server 201) that is handling an "open" or "online" interaction session. For these interactions, the client may explicitly resolve the customer ID and associate the customer ID to the customer's interactions. Using this single customer ID, systems may directly retrieve all other open or closed interactions of the same customer. Explicit customer resolving may be executed by stored procedure 230 or by a dedicated API over the customer cache 228 layer.

FIGS. 2A and 2B, 3A and 3B, and 4A and 4B, each provide a different alternative system structure. In FIGS. 2A and 2B, the main resolving interface may be stored procedures 230, which may be used to implement the following functionality (other or different functionality may also be implemented):

(1) Explicit customer resolving (e.g., "direct resolving")—Resolving executed directly by resolver 148 installed at a customer entity client, such as, call server 201. For example, call server 201 may perform explicit customer resolving for web and telephone interactions. Call server 201 may then insert the interaction data and their associated customer identity data (e.g., customer ID) into interactions database 226.

(2) Implicit customer resolving (e.g., "indirect resolving")—Resolving executed in background operations, for example, by resolver 148 installed within database 226. Database 226 may then store the interaction data and the associated customer identity data. In one example, implicit customer resolving may be used by media interconnect module 212 since the customer identity of the interactions may not be relevant to media interconnect module 212. Hence, media interconnect module 212 may trigger resolver 148 to resolve its interactions using a subset of stored procedure 230 in database 226 that is designated for implicit customer resolving. Database 226 may resolve customers using internal queries (e.g., in a structured query language (SQL)) executed at a processor (e.g., an internal processor 236) and, for example, not using external applications/resolvers 148 (database 226 may use the same/similar queries as resolver 148).

(3) Customer and account operations—Add, delete, and/or update customers and/or account information profiles in customer repository 222.

(4) Import/export customer repository 222—import application module 210 may import/export customer information to/from customer repository 222, for example, using an extensible markup language (XML) or comma-separated value (CSV) file.

In contrast to systems 200 and 202 of FIGS. 2A-2B, systems 300, 302 and 400, 402 of FIGS. 3A-4B may include an intermediate customer cache 228 layer (e.g., customer cache 128 of FIG. 1A), which may be used to resolve customer interactions. Cache 228 may be operated by any one or more processor(s), using a distributed cache, or by a centralized processor in interaction center 224 or resolver 148. The use of customer cache 228 may take advantage of the fact that the customers that have most recently accessed interaction center 224 are the most likely to access the center 224 in the future. Customer cache 228 may store data from customer repository 222 for the most recently resolved customers for use to resolve future interactions for the same customers. In one example, each new customer added to customer cache 228 may displace a least recently used (LRU) customer entry in customer cache 228. If a customer connects to interaction center 224, where customer cache 228 does not store data for resolving the customer, such data may be transferred from customer repository 222 to update customer cache 228 or may be handled directly by database 226, for example, without updating customer cache 228.

In FIGS. 3A and 3B, the main resolving interface may include customer cache 228 combined with database 226 executing a background resolving process. The same functionality implemented by system 200, 202 may also be implemented by systems 300, 302 with one or more of the following differences (other or additional differences may also be used):

(1) All customer entity operations may be executed using customer cache 228. Customer entity operations may include, for example, customer resolving, add/remove/update customer profile information, etc.

(2) Customer resolving may be semi-explicit and semi-implicit. Clients (e.g., media interconnect module 212) may use background database 226 "implicit" resolving, but may also update customer cache 228 with the results for "explicit" resolving. Alternatively, customer cache 228 may execute the background resolving instead of database 226.

(3) In some embodiments, the entire customer repository 222 may be stored in customer cache 228 (e.g., when repository 222 is sufficiently small or customer cache 228 is sufficiently large). In such embodiments, background resolving may be completely eliminated and all resolving may be executed using customer cache 228.

In FIGS. 4A and 4B, the main resolving interface may be customer cache 228, alone. The same functionality implemented by system 200, 202 may also be implemented by systems 400, 402 with one or more of the following differences (other or additional differences may also be used):

(1) Customer entity operations may be executed using customer cache 228.

(2) In one embodiment, only explicit customer resolving may be used (implicit resolving may be unavailable). Clients may resolve customers by themselves and afterwards, may update database 226 with the interaction and the customer identity.

The functionalities of FIGS. 2A-4B may be used in other systems, for example, the systems of FIGS. 1A and 5.

In FIGS. 2A-4B, system components may operate, for example, as follows.

Database 226 may implement all stored procedures 230 to support different customer APIs. Database 226 may be deployed, for example, as follows:

Customer repository 222 may be managed using a database run on the same server as database 226.

In a linked data hub environment, the customer repository 222 entries may be duplicated among all data hubs.

Stored Procedures 230 may, for example:

Provide stored procedures for customer operations:
  Add Account/Customer.
  Remove Account/Customer.
  Update Account/Customer.

Provide an explicit customer resolving method.
  The method receives the customer identifier type and value as input parameters, and outputs the customer details. An example of a command for explicit customer resolving may be Resolve ("e-mail", asd@asd.asd) and/or Resolve ("phone", "1234567890").

Provide an implicit customer resolving method for resolving interactions and association the interactions with the resolved customers.
  The method receives the entire interaction, customer identifier type and value as input parameters and, after a background resolving process, outputs the customer identity and associates the customer identity to the interaction.

Provide import and export operations.

Support unresolved customers—any resolving that fails to identify the interacting customer may save the resolving details (identifier type and value). Later, a periodic procedure may attempt to resolve any previously unresolved interactions. The periodic time interval to save and/or attempt to resolve any unresolved customers may be configurable, with a default value of, for example, seven days.

Plug-in 208 may include user administrative functionality to manage customer profiles, for example, in customer repository 222 or cache 228. Plug-in 208 may be hosted in a system administrator service and may expose all customer APIs methods. Plug-in 208 may, for example:

Add Account/Customer.

Delete Account/Customer.

Update Account/Customer.

Get Account/Customer.

Import application module 210 may handle importing and/or exporting data to/from customer repository 222, for example, including:

Importing customer data, including full, partial and/or updated customer profiles.

Exporting customer data.

Deleting customer data.

Import/Export tasks may be run or executed using plug-in 208, or directly using database 226, for example, using an API published respectively thereby.

Customer entity plug-in 208 may support basic configuration parameters, for example:

Deletion retention: retaining data or metadata related to a deleted data object. The retained data may be kept for a predefined period of time (e.g., six months) after which it may be deleted. In one example, customer data is "deleted" by initially only marking the data as deleted and then actually deleting the data only after the predefined period (e.g., 6 months) has elapsed.

Retroactive identification period: a time period in which unresolved customer identifier are retained to potentially retroactively resolve the interaction. In one example, resolver 148 may receive an interaction with customer identification: e-mail=a@b.com for an unknown user (e.g., not registered as a customer) and may fail to resolve the interaction. Resolver 148 may retain this e-mail for the retroactive identification period, for example, one month. If the associated user registers as a customer within that time period, resolver 148 may retroactively resolve the interaction using the e-mail that is now defined by the new customer information. If however, the retroactive identification period passes and the associated user does not become a customer, the system may automatically delete the e-mail.

Customer entity plug-in 208 may also manage a table (e.g., Table 1) to maintain new or updated customer entity attributes stored for resolver 148 to use to resolve customer interactions. Table 1 data may be imported, for example, to customer repository 222 and/or customer cache 228 and may be configured, for example, as follows:

TABLE 1

Customer Entity Attribute Data

| Attribute Name | Business Data | Tenant | Entity | Type |
|---|---|---|---|---|
| Customer ID | nvcCustomerID | 1 | Customer | CRM-ID |
| IVRID | None | 1 | Account | Phone |

The first row of Table 1 defines an attribute referred to as "Customer ID." Customer ID may be associated with (already) existing business data "nvcCustomerID." This way, once connection server 218 inserts a value into this business data field, resolver 148 may automatically resolve the data using the customer identifier type (e.g., customer relationship management (CRM) ID).

The second row of Table 1 defines an attribute referred to as "interactive voice response (IVR) ID." In the example shown in Table 1, IVR ID is not associated with any business data (e.g., indicated by "None" in the Business Data column of Table 1). Thus, this attribute may be used only for customer/account resolving. For example, business data that is not associated with customer attributes may only be used for data saving, while business data that is associated with customer attributes may be used for data saving and for customer resolving. If resolver 148 gets a value for this attribute (e.g., from CTI 224), resolver 148 may resolve the account using the account identifier type (e.g., telephone). After resolving this data, the resolved data may be stored in customer repository 222 and/or customer cache 228 and resolver 148 may discard the original customer information used for resolving.

Embodiments of the invention may use resolver 148 clients to resolve customers. Customer resolving clients may include any component (e.g., software or code executed by a processor) that holds interactions to be resolved, such as, call server 201, which explicitly resolves customer, or media interconnect module 212, which implicitly resolve customers using dedicated stored procedures 230.

To improve efficiency, explicit customer resolving may be centralized or executed completely within a single device or component, such as, resolver 148 (or other components, such as a distributed cache). In such embodiments, a new type of data may be used, for example, referred to as "customer entity attributes". Customer entity attributes may be associated with an existing business data or may be generated from scratch. The user or customer may define the exact mapping between the attributes and the customer/account identifier type. For example, defining an attribute name (e.g., "IVRID") may cause each value received for such an attribute to be resolved using the customer type "Social Number". This way, the customer resolving client, e.g., resolver 148, may be the only component holding the logic to resolve the customers based on the interaction information. Furthermore, direct clients linked to resolver 148, such as, web analyzer 216, a driver and a monitor (e.g., monitor 516 of FIG. 5) may only need to transfer the relevant values inside these attribute fields, for example, without themselves recognizing the customer identity or the meaning associated with the values they transfer.

Reference is made to FIG. 5, which schematically illustrates a system 500 for centralized resolving of customer interactions in a multi-platform environment in accordance with an embodiment of the invention. Components and processes of FIG. 5 may be executed using devices and processors of FIGS. 2A-4B, such as, for example, resolver 148, call server 201, connect server 214, web analyzer 216, database 226, and a CTI machine in interactions center 224.

System 500 may include a private branch exchange (PBX) 502, an interface 504 for interacting with clients, users, customers (e.g., operating user devices 102 of FIG. 1A), and/or PO clients, a CTI machine 506 (e.g., CTI machine in interactions center 224 of FIGS. 2B, 3B, 4B), a web analyzer 508 (e.g., web analyzer 216 of FIGS. 2A-4B), a record on demand (ROD) application 510, a monitor application 512 (e.g., monitor application 240 of FIGS. 2B, 3B, 4B), a connect server 514 (e.g., connect server 214 of FIGS. 2A-4B), a monitor server 516 (e.g., monitor server 206 of FIGS. 2B, 3B, 4B), a call server 520 (e.g., call server 201 of FIGS. 2A-4B), a resolver 148, a database 522 (e.g., database 226 of FIGS. 2A-4B), and customer attribute data 524.

PBX 502 may be a telephone exchange that process or handles telephone and/or voice interactions within a private network, such as a company or interaction center (e.g., interaction center 224 of FIGS. 2A-4B). In one example, PBX 502 may generate values (e.g., 1234) for an attribute 524 (e.g., IVR ID) associated with a telephone and/or phone number interaction type. Interface 504 may connect system 500 to additional channels to process multi-platform customer interactions and/or to receive system configuration input, for example, from clients, users, customers, and/or PO clients. Interface 504 may generate values (e.g., a@b) for an attribute 524 (e.g., EMAIL) associated with an e-mail interaction type.

CTI machine 506 may integrate interactions and attribute values received from computer and telephone devices, such as, PBX 502. Web analyzer 508 may monitor and analyze a customer's computer or web interactions. ROD application 510 may monitor and analyze a customer's recorded interactions, such as, recorded e-mails to/from a customer at a specified e-mail address (e.g., a@b). ROD application 510 may start and stop a capture device (e.g., capture servers 110 of FIG. 1A) to selectively record "important" interactions, for example, interactions that meet predetermined criteria set by clients, users, or PO designers (e.g., via interface 504). ROD application 510 may also view statistics and prompt users for their personal profile or attribute 524 data. Connect server 514 may connect system 500 to customer interaction sessions in real-time.

A centralized resolver 148 (e.g., installed at call server 201) may having exclusive access to all the logic, programs and information used to determine the identity of customers associated with interactions. Call server 201 may interface with direct clients, such as, a driver, web analyzer 508 and monitor 516, and indirect clients, such as, monitor application 512, ROD application 510, and connect server 514. Resolver 148 may receive and recognize customer attributes 524 from all the system clients via designated virtual resolving channel(s) 526. To resolve an interaction which took place or which was executed over one of multiple channels in a cross-channel network and/or including one of multiple types of media data, customer attributes 524 may be sent to the resolving client (e.g., resolver 148) to inform the client of the appropriate attribute type and value corresponding to the relevant channel or data type of the interaction. Once the customer attributes 524 type is known, components communicating with the resolving client need not change their behavior, only provide the attribute value for the specified attribute type (e.g., ivr or customer email), for a seamless integration and monitoring for all types of media, channels and interaction environments. Resolver 148 may look-up one of the received attribute values (e.g., 1234 and/or a@b) in the associated table (e.g., ivr or customer email table 154, respectively, of FIG. 1B) to determine the customer universal identifier and resolve the interaction.

Centralized resolver 148 may handle both customer resolving and associating the customer identity to the interaction, for example, using customer attributes 524. Customer attributes 524 may be provided, for example, via one or more of the following:

Database 522 plug-in.
Interaction center plug-in (e.g., interaction center 224).

Alternatively, instead of plug-ins, applications or other software or hardware modules may be used to provide customer attributes 524 and their updates.

Centralized resolver 148 may provide the following functionality (other or different functionality may also be implemented):

Support customer resolving of interaction data. Centralized resolver 148 may recognize that interaction data is related to a customer entity. Centralized resolver 148 may resolve the corresponding interaction and associate the returned customer ID with an interaction.

Send relevant events or interactions associated with the resolved customer. For example, when monitor 516 updates the business data to be resolved, centralized resolver 148 may receive an event associated with the resolved customer ID.

Alternatively, customers may be resolved using a customer cache (e.g., customer cache 228 of FIGS. 3A-4B).

Figure 6:
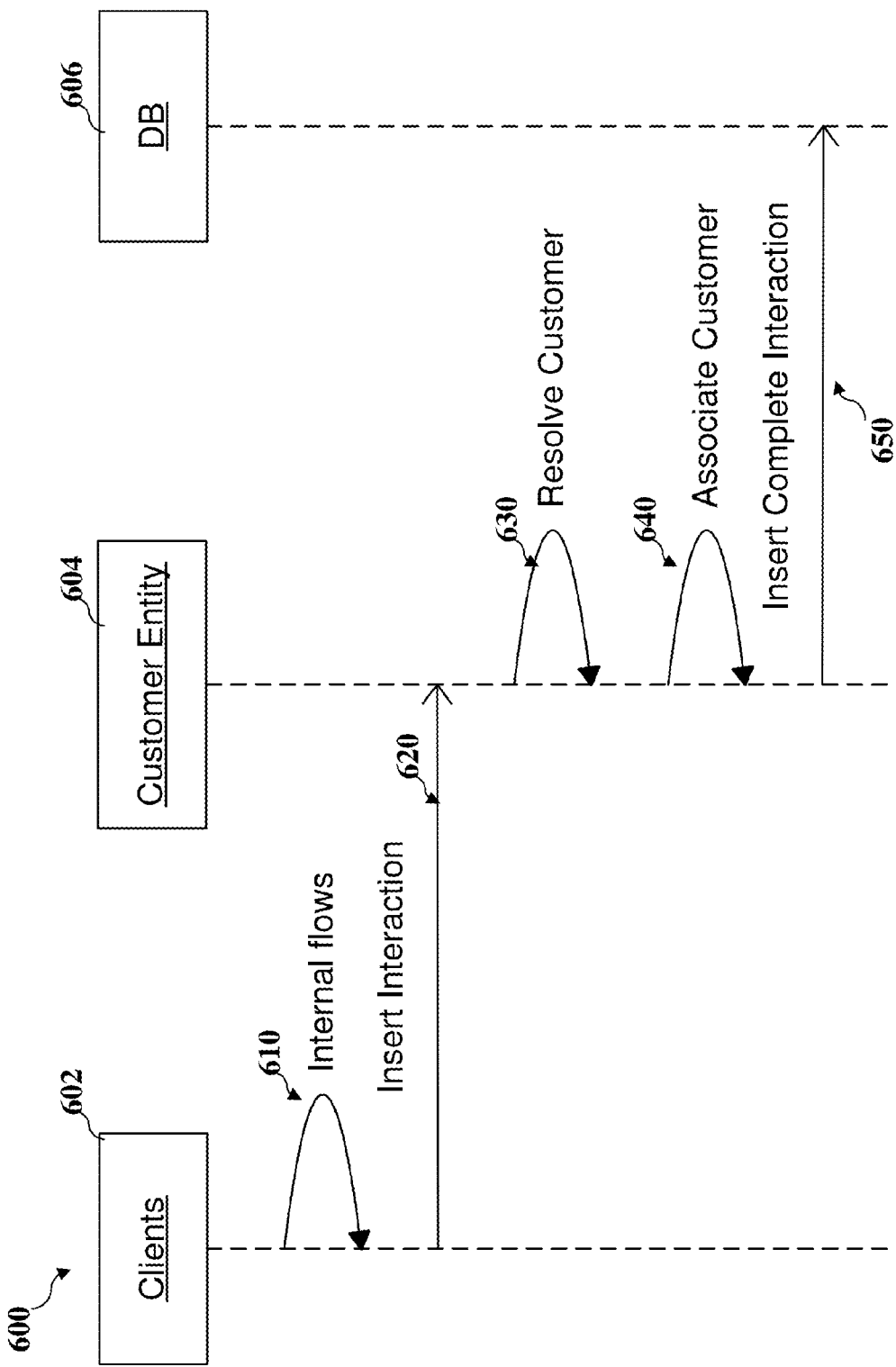
FIGS. 6 and 7 schematically illustrate workflows for centralized customer resolving, without and with a customer cache, respectively, in accordance with embodiments of the invention.
Figure 7:
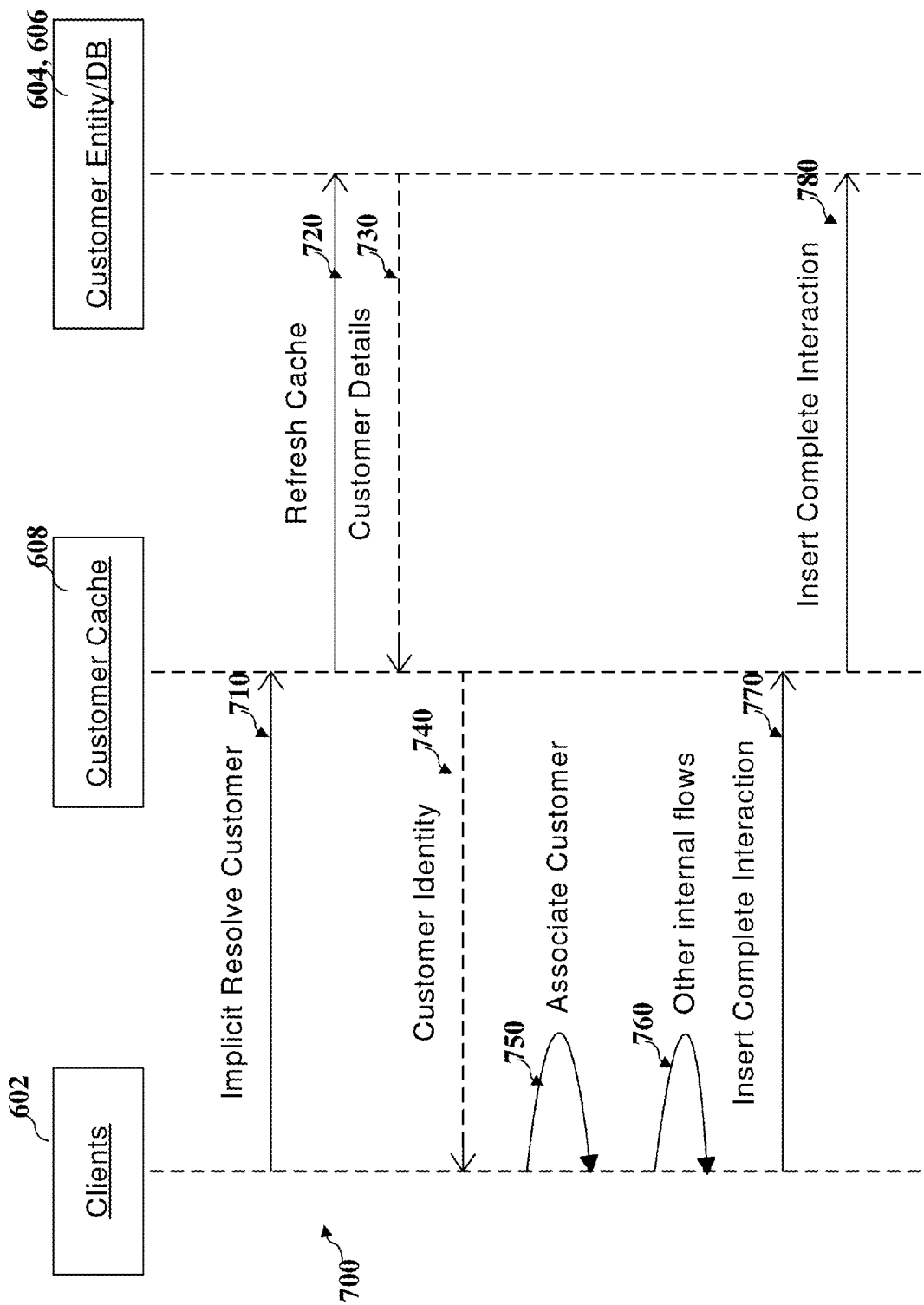

Reference is made to FIGS. 6 and 7, which schematically illustrate workflows 600 and 700 for centralized customer resolving, without and with a customer cache, respectively, in accordance with embodiments of the invention. Workflows 600 and 700 may be executed using one or more clients 602 (e.g., resolver 148 of FIGS. 1A, 2A-5), a customer entity 604 (e.g., plug-in 208 of FIGS. 2A-4B) and a database 606 (e.g., database 226 of FIGS. 2A-4B). Workflow 700 may additionally include a customer cache 608 (e.g., customer cache 228 of FIGS. 3A-4B).

In workflow 600 of FIG. 6, customer resolving may be executed by clients 602 themselves and not by a centralized resolver (e.g., resolver 148 at call server 201 of FIGS. 2A-4B). This type of resolving may be used, for example, when clients 602 request the identity of a customer in an associated interaction (e.g., in real-time).

In operation 610, clients 602 may initiate an internal flow. The internal flow may include any pre-processing step, such as, a text capture device (e.g., text capture module 204 of FIGS. 2A-4B) preparing a customer e-mail interaction for resolving.

In operation 620, clients 602 may insert an interaction into customer entity 604.

In operation 630, customer entity 604 may resolve the customer by identifying the customer involved in the interaction inserted in operation 620. For example, customer entity 604 may extract customer details (IP address, telephone number, etc.) from the interaction inserted in operation 620, determine a type or attributes of the extracted customer details (e-mail address, telephone number, etc.), and find a single universal customer identifier in a customer repository (e.g., customer repository 127 or 150 of FIGS. 1A-1B) associated with customer details of that attribute type.

In operation 640, customer entity 604 may associate the customer identified in operation 630 with the interaction inserted in operation 620. For example, customer entity 604 may assign the customer's universal identifier to the interaction.

In operation 650, customer entity 604 may insert the complete interaction (e.g., the interaction itself from operation 620 and the associated customer data from operation 640) into database 606.

Other operations or orders of operations may be used.

In workflow 700 of FIG. 7, customer resolving may be executed using customer cache 608.

In operation 710, clients 602 may resolve a customer for an interaction and update the resolved customer data to customer cache 608.

In operation 720, customer cache 608 may update the resolved customer data in customer entity 604 and/or database 606.

In operation 730, customer entity 604 and/or database 606 may return customer details (e.g., from customer repository 222 of FIGS. 2B, 3B, 4B) associated with the resolved customer to customer cache 608.

In operation 740, customer cache 608 may use the customer details to generate a customer identity (e.g., customer ID) universally associated with all that customer's interactions across one or more channels and for one or more media types and operating environments.

In operation 750, clients 602 may associate the customer identity from operation 740 with the interaction resolved in operation 710.

In operation 760, clients 602 may execute other internal flows. The internal flow may include any post-processing step for finalizing the interaction or its resolved customer identity.

In operation 770, clients 602 may insert the complete interaction (e.g., the interaction itself and the associated customer identity from operation 740) into customer cache 608.

In operation 780, customer cache 608 may transfer and insert the complete interaction into database 606.

Other operations or orders of operations may be used.

In some embodiments, the use of customer cache 608 in workflow 700 of FIG. 7 and in systems 300 and 400 of FIGS. 3A and 4A may provide advantages over workflow 600 of FIG. 6 and system 200 of FIG. 2A operating without a customer cache. For example, customer cache 608 may allow data from previously resolved customers to be used to resolve repeat or return customers to increase resolving speed. The greater the rate of return of customers (e.g., within a time period that the data is stored in the cache), the greater the increase in resolving speed due to customer cache 608.

Reference is made FIG. 8, which schematically illustrates statistical data defining the rate of return of customers to an interaction center in accordance with an embodiment of the invention. The statistical data shown in FIG. 8 is derived from information collected in a consumer survey.

The rate of return is defined for each of a plurality of communication channels, such as, e-mail messaging, automated telephone, live chat, standard mail, live sales representative, face-to-face interactions at a physical location and a company website. The criterion for a return customer may be that the customer repeatedly contacts the center (e.g., via the same or different channels) within a predefined period of time (e.g., one week). As shown in FIG. 8, the return rate of customers for that predetermined time is significant, for example, ranging from a minimum of 14% to a maximum of 64% for customers returning via the company website. Accordingly, the increase in resolving speed is significant, with the greatest increase for customers returning via the company website. In general, the greater the rate of return, the greater the increase in resolving sped due to the customer cache.

Figure 9:
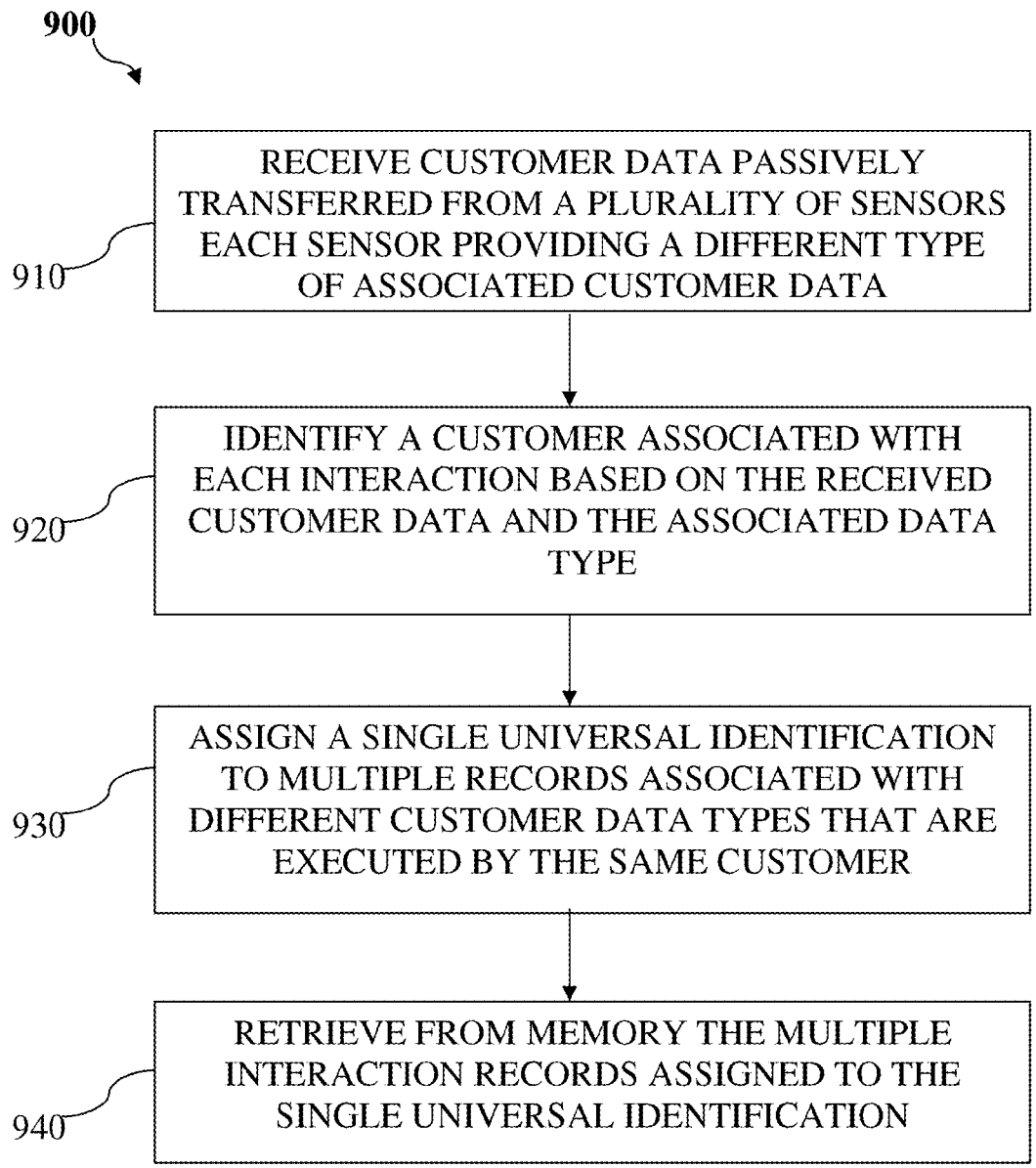
FIG. 9 is a flowchart of a method for resolving customer interactions in a multi-platform environment in accordance with an embodiment of the invention.

Reference is made FIG. 9, which is a flowchart of a method 900 for resolving customer interactions in a multi-platform environment in accordance with an embodiment of the invention.

In operation 910, a centralized resolver (e.g., resolver 148 of FIG. 1A) executing a processor (e.g., processor 142 of interaction center 124 of FIG. 1A) may receive customer data passively transferred from a plurality of devices (e.g., user devices 102 of FIG. 1A). Each device may process a different type of customer interaction and may provide a different associated type of customer data. The data may only be defined at the centralized resolver that receives the data, but not the plurality of devices that send the data. The customer data may define the customer associated with interactions may be recorded in support center environments, such as call centers and online forums, using a capture server (e.g., capture server 110 of FIG. 1A). The communication channels may include, for example, Internet, Intranet, public network, private network, local area network, wide area network, text messaging, SMS messaging, e-mail messaging, radio, and/or telephone.

In operation 920, the processor may identify a customer associated with each interaction based on the received customer data and the associated data type. In one embodiment, the processor may look-up the received customer data in a customer table in a customer repository (e.g., repository 127 or cache 128 of FIG. 1A) storing customer data of the associated data type. The table may provide a unique single identification associated to the customer data of that type. The single identification may universally identify the associated customer.

In operation 930, the processor may assign a single or universal identification (e.g., customer ID) to multiple interaction records respectively associated with different customer data types when the same customer (e.g., operating one or more user devices 102 of FIG. 1A) is identified for each of the customer data types. For example, the same universal identification may be assigned to all interaction records executed over multiple different communication channels that are identified to be executed by a single customer. In some embodiments, the assigning operation (customer resolving) may be executed by a single centralized client (e.g., call center 201), while in other embodiments, the assigning operation may be distributed among a combination of different components (e.g., call center 201 and cache 228 of FIG. 2).

In operation 940, once the identification is assigned, the processor may retrieve the multiple interaction records from memory, such as short or long-term storage (e.g., database 126, customer repository 127 and/or customer cache 128 of FIG. 1A), based on the assigned universal identification. The retrieved interaction records or a summary or history thereof may be sent to a support center agent interacting with the customer, for example, in real-time (while the interaction is ongoing) or offline (after the interaction has ended).

Other operations or orders of operations may be used.

It may be appreciated that "real-time" may refer to instantly, at a small time delay of, for example, between 0.01 and 10 seconds, during the same interaction or session, concurrently, or substantially at the same time as. For example, recording and resolving interactions in real-time may include recording and resolving interactions while the interactions or interaction sessions are ongoing.

It may be appreciated that "passively" transferring customer data, e.g., from device components to a centralized resolver, may refer to transferring the data without analyzing, processing or resolving the data. In one embodiment, passively transferring customer data may refer to processing, handling or transferring the data without knowing the meaning of the data. For example, customer data, such as a string of letters or numbers (e.g., 123-456-7890 or a.s@abc.com), may only be fully defined or have meaning when associated with a data type or customer attribute (e.g., telephone or e-mail, respectively). Since the customer attribute are only known or defined at the centralized resolver, even though other components handle the customer data, only the centralized resolver recognizes the meaning of the customer data.

It may be appreciated that although embodiments of the invention are described to operate in real-time, such embodiments may also operate off-line, for example, at a later time. In one embodiment, interactions may be recorded and resolved, for example, at a predetermined time or time delay after the interactions.

It may be appreciated that although certain devices and functionality are assigned to "customers" and "agents" in a support center environment, such functionality may be implemented by any users in any environment. Furthermore, "customers" associated to a support center may include any user listed in a customer repository, database, e-mail or telephone list, etc., and need not actually access the support center, purchase items from the support center or otherwise use the center's resources. Users may include two or more live users, two or more automated user(s) or a combination of live user(s) and automated user(s).

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method for resolving a customer interaction, the method comprising:
at a centralized resolver executing one or more processors:
receiving customer data records of a plurality of different communication channel types passively transferred from a plurality of devices peripheral to the centralized resolver, wherein each customer data record includes a channel-specific identifier that is a partial sub-set of a customer's complete data profile that is associated with a particular communication channel type but cannot be used by the peripheral devices to identify the customer associated with the customer data records, wherein each peripheral device processes customer data records associated with a different communication channel type in a cross-channel environment, and wherein the centralized resolver associates each of the plurality of different communication channel types with a different communication channel type attribute defining the communication channel type of the customer data record, wherein each communication channel type attribute is defined as a parameter or data item associated with the communication channel type only at the centralized resolver and not at the peripheral devices;
identifying a customer to be a person associated with the received customer data record by looking up the channel-specific identifier in a repository based on the communication channel type attribute corresponding to the communication channel type of the customer data record to provide a single universal identification associated with the customer data record of that communication channel type, wherein only the universal identification identifies the customer while the channel-specific identifier does not identify the customer until it is associated with the universal identification at the central resolver;
assigning to the customer data record said universal identification associated with the identified customer, wherein the same universal identification is assigned to customer data records of each of the different communication channel types that are associated with the same customer; and
once an identification is assigned to a customer data record in an ongoing interaction, retrieving customer data records from multiple previous interactions based on the single universal identification.

2. The method of claim 1, wherein the associated communication channel type is defined by a communication channel type attribute and the customer data record is defined by values for that communication channel type attribute.

3. The method of claim 2, wherein the centralized resolver is the sole device at which the communication channel type attributes are defined.

4. The method of claim 1, wherein the centralized resolver is the sole device in the system that has access to the complete set of customer data records to fully resolve customer data records of the plurality of communication channel types.

5. The method of claim 1, wherein logic to determine the customer associated with each customer data record is exposed only to the centralized resolver and hidden from all other system components.

6. The method of claim 1 comprising storing customer information duplicated from a repository for the most recently resolved customers in a cache locally accessible to the centralized resolver to identify the customer associated with the customer data record.

7. The method of claim 1 comprising, if the identity of the customer that executed the customer data records is not found, attempting to resolve the previously unresolved customer data record at a predetermined later time.

8. The method of claim 1, wherein the customer data records are recorded and resolved in real-time.

9. The method of claim 1, wherein the customer data records with customers are recorded in one or more support center environments.

10. The method of claim 1, wherein the customer data record is created by a user.

11. The method of claim 1, wherein the customer data record is encrypted and only the centralized resolver has a key to decrypt the customer data record.

12. The method of claim 1 comprising:
generating a summary of the customer's previous customer data records; and
displaying the summary to an agent.

13. The method of claim 1, wherein the retrieved customer data records or a summary or history thereof are sent to an agent interacting with a customer during the ongoing interaction.

14. A system for resolving a customer data record, the system comprising:
one or more memories to store customer data records; and
a centralized resolver configured to:
receive customer data records of a plurality of different communication channel types passively transferred from a plurality of devices peripheral to the centralized resolver, wherein each customer data record includes a channel-specific identifier that is a partial sub-set of a customer's complete data profile that is associated with a particular communication channel type but cannot be used by the peripheral devices to identify the customer associated with the customer data records, wherein each peripheral device processes customer data records associated with a different communication channel type in a cross-channel environment, and wherein the centralized resolver associates each of the plurality of different communication channel types with a different communication channel type attribute defining the communication channel type of the customer data record, wherein each communication channel type attribute is defined as a parameter or data item associated with the communication channel type only at the centralized resolver and not at the peripheral devices;
identify a customer to be a person associated with the received customer data record by looking up the channel-specific identifier in a repository based on the communication channel type attribute corresponding to the communication channel type of the customer data record to provide a single universal identification associated with the customer data record of that communication channel type, wherein only the universal identification identifies the customer while the channel-specific identifier does not identify the customer until it is associated with the universal identification at the central resolver;
assign to the customer data record said universal identification associated with the identified customer, wherein the same universal identification is assigned to customer data records of each of the different communication channel types that are associated with the same customer; and
once an identification is assigned to a customer data record in an ongoing interaction, retrieve customer data records from said memory from multiple previous interactions based on the single universal identification.

15. The system of claim 14, wherein the associated communication channel type is defined by a communication channel type attribute and the customer data record is defined by values for that communication channel type attribute.

16. The system of claim 14, wherein the centralized resolver is the sole device in the system that has access to the complete set of customer data records to fully resolve customer data records of the plurality of communication channel types.

17. The system of claim 14, comprising a cache locally accessible to the centralized resolver to store customer information duplicated from a repository for the most recently resolved customers.

18. The system of claim 14, wherein the memory stores the received customer data records for customers that cannot be identified, wherein the centralized resolver uses the unidentified customer data records to attempt to resolve the previously unresolved customer data records at a predetermined later time.

19. The system of claim 14, wherein the centralized resolver is further configured to generate a summary of the customer's previous customer data records, wherein the system comprises a display for displaying the retrieved customer data records or a summary thereof to an agent during the ongoing interaction.

* * * * *